United States Patent
Finn et al.

(10) Patent No.: US 8,991,712 B2
(45) Date of Patent: Mar. 31, 2015

(54) COUPLING IN AND TO RFID SMART CARDS

(75) Inventors: David Finn, County Mayo (IE); Klaus Ummenhofer, Kaufbeuren (DE)

(73) Assignee: Féinics Amatech Teoranta, Lower Churchfield, Tourmakeady, Co. Mayo (IE)

( * ) Notice: Subject to any disclaimer, the term of this patent is extended or adjusted under 35 U.S.C. 154(b) by 174 days.

(21) Appl. No.: 13/600,140

(22) Filed: Aug. 30, 2012

(65) Prior Publication Data

US 2013/0075477 A1    Mar. 28, 2013

Related U.S. Application Data

(63) Continuation-in-part of application No. PCT/EP2012/065409, filed on Aug. 7, 2012, and a continuation-in-part of application No. 13/205,600, filed on Aug. 8, 2011, now Pat. No. 8,474,726, and a (Continued)

(51) Int. Cl.
| | |
|---|---|
| *G06K 19/06* | (2006.01) |
| *G06K 19/077* | (2006.01) |
| *H01Q 1/22* | (2006.01) |
| *H01Q 7/00* | (2006.01) |
| *H01F 38/14* | (2006.01) |

(52) U.S. Cl.
CPC ...... *G06K 19/07794* (2013.01); *G06K 19/0775* (2013.01); *H01Q 1/2225* (2013.01); *H01Q 1/2283* (2013.01); *H01Q 7/00* (2013.01); *H01F 38/14* (2013.01)
USPC .................................................. 235/492

(58) Field of Classification Search
USPC ........................................................ 235/492
See application file for complete search history.

(56) References Cited

U.S. PATENT DOCUMENTS

| 4,463,971 A | 8/1984 | Hoppe et al. |
| 5,012,236 A | 4/1991 | Troyk et al. |

(Continued)

FOREIGN PATENT DOCUMENTS

| CA | 2279176 | 7/1998 |
| DE | 39 35 364 | 8/1990 |

(Continued)

OTHER PUBLICATIONS

Product short data sheet, P5CD016/021/041/051 and P5Cx081 family, Secure dual interface and contact PKI smart card controller, Rev 3.2—Mar. 2011, 20 pages.

(Continued)

*Primary Examiner* — Kristy A Haupt
(74) *Attorney, Agent, or Firm* — Gerald E. Linden

(57) ABSTRACT

A data carrier such as a smart card comprising an antenna module (AM) and a booster antenna (BA). The booster antenna (BA) has an outer winding (OW) and an inner winding (IW), each of which has an inner end (IE) and an outer end (OE). A coupler coil (CC) is provided, connecting the outer end (OE, b) of the outer winding (OW) and the inner end (IE, e) of the inner winding (IW). The inner end (IE, a) of the outer winding (OW) and the outer end (OE, f) of the inner winding (IW) are left un-connected (free floating). The coupler coil (CC) may have a clockwise (CW) or counter-clockwise (CCW) sense which is the same as or opposite to the sense (CW or CCW) of the outer and inner windings. Various configurations of booster antennas (BA) are disclosed.

21 Claims, 11 Drawing Sheets

Related U.S. Application Data continuation-in-part of application No. 13/310,718, filed on Dec. 3, 2011, now Pat. No. 8,366,009.

(60) Provisional application No. 61/373,269, filed on Aug. 12, 2010, provisional application No. 61/521,741, filed on Aug. 9, 2011, provisional application No. 61/533,228, filed on Sep. 11, 2011, provisional application No. 61/536,153, filed on Sep. 19, 2011, provisional application No. 61/586,781, filed on Jan. 14, 2012, provisional application No. 61/624,384, filed on Apr. 15, 2012.

(56) References Cited

U.S. PATENT DOCUMENTS

| | | |
|---|---|---|
| 5,084,699 A | 1/1992 | DeMichele |
| 5,261,615 A | 11/1993 | Cuttelod |
| 5,270,717 A | 12/1993 | Schuermann |
| 5,281,855 A | 1/1994 | Hadden et al. |
| 5,393,001 A | 2/1995 | Gustafson |
| 5,572,410 A | 11/1996 | Gustafson |
| 5,574,470 A | 11/1996 | De Vall |
| 5,606,488 A | 2/1997 | Gustafson |
| 5,649,352 A | 7/1997 | Gustafson |
| 5,773,812 A | 6/1998 | Kreft |
| 5,809,633 A | 9/1998 | Mundigl et al. |
| 5,955,723 A | 9/1999 | Reiner |
| 5,969,951 A | 10/1999 | Fischer |
| 5,988,510 A | 11/1999 | Tuttle |
| 6,008,993 A | 12/1999 | Kreft |
| 6,088,230 A | 7/2000 | Finn et al. |
| 6,095,423 A | 8/2000 | Houdeau et al. |
| 6,107,920 A | 8/2000 | Eberhardt et al. |
| 6,142,381 A | 11/2000 | Finn et al. |
| 6,190,942 B1 | 2/2001 | Wilm et al. |
| 6,233,818 B1 | 5/2001 | Finn et al. |
| 6,285,342 B1 | 9/2001 | Brady et al. |
| 6,295,720 B1 | 10/2001 | Finn et al. |
| 6,310,778 B1 | 10/2001 | Finn et al. |
| 6,373,447 B1 | 4/2002 | Rostoker et al. |
| 6,375,083 B2 | 4/2002 | Fries |
| 6,378,774 B1 | 4/2002 | Emori et al. |
| 6,390,375 B2 | 5/2002 | Kayanakis |
| 6,406,935 B2 | 6/2002 | Kayanakis et al. |
| 6,424,301 B1 | 7/2002 | Johnson et al. |
| 6,460,773 B1 | 10/2002 | Kaiya et al. |
| 6,568,600 B1 | 5/2003 | Carpier et al. |
| 6,576,081 B2 | 6/2003 | Date et al. |
| 6,634,564 B2 | 10/2003 | Kuramochi |
| 6,698,089 B2 | 3/2004 | Finn et al. |
| 6,715,688 B2 | 4/2004 | Kobayashi et al. |
| 6,719,206 B1 | 4/2004 | Bashan et al. |
| 6,851,618 B2 | 2/2005 | Halope |
| 6,867,981 B2 | 3/2005 | Murohara |
| 6,881,605 B2 | 4/2005 | Lee et al. |
| 7,028,910 B2 | 4/2006 | Reignoux |
| 7,268,740 B2 | 9/2007 | Oberle |
| 7,286,053 B1 | 10/2007 | Gudeman et al. |
| 7,320,738 B2 | 1/2008 | Radenne et al. |
| 7,626,548 B2 | 12/2009 | Matsushita et al. |
| 7,692,546 B2 | 4/2010 | Camp et al. |
| 7,928,918 B2 | 4/2011 | Caruana et al. |
| 7,980,477 B2 | 7/2011 | Finn |
| 8,100,337 B2 | 1/2012 | Artigue et al. |
| 8,130,166 B2 | 3/2012 | Ayala et al. |
| 2001/0011012 A1 | 8/2001 | Hino et al. |
| 2002/0020903 A1 | 2/2002 | Kreft et al. |
| 2002/0089049 A1 | 7/2002 | Leduc et al. |
| 2002/0105232 A1 | 8/2002 | Parrault |
| 2003/0116790 A1 | 6/2003 | Kikuchi et al. |
| 2003/0155420 A1 | 8/2003 | Morrow et al. |
| 2005/0066513 A1 | 3/2005 | Kayanakis et al. |
| 2006/0054709 A1 | 3/2006 | Lee |
| 2007/0171074 A1 | 7/2007 | Camp et al. |
| 2008/0246614 A1 | 10/2008 | Paananen |
| 2008/0283615 A1 | 11/2008 | Finn |
| 2008/0308641 A1 | 12/2008 | Finn |
| 2008/0314990 A1 | 12/2008 | Rietzler |
| 2009/0057414 A1 | 3/2009 | Brunet et al. |
| 2009/0152362 A1 | 6/2009 | Ayala et al. |
| 2010/0176205 A1 | 7/2010 | Patrice |
| 2010/0283690 A1 | 11/2010 | Artigue et al. |
| 2011/0155811 A1 | 6/2011 | Rietzler |
| 2011/0163167 A1 | 7/2011 | Artigue et al. |
| 2012/0055013 A1 | 3/2012 | Finn |
| 2012/0061473 A1 | 3/2012 | Forster et al. |
| 2012/0064307 A1 | 3/2012 | Forster et al. |

FOREIGN PATENT DOCUMENTS

| | | |
|---|---|---|
| DE | 44 43 980 | 6/1996 |
| DE | 196 32 115 | 12/1997 |
| DE | 43 11 493 | 4/2000 |
| DE | 100 10 936 | 9/2001 |
| DE | 69706577 | 9/2001 |
| DE | 102006024247 | 11/2007 |
| DE | 199 15 765 | 10/2010 |
| EP | 0 839 360 | 5/1998 |
| EP | 0 875 039 | 11/1998 |
| EP | 0 922 289 | 6/1999 |
| EP | 0 931 295 | 7/1999 |
| EP | 0 977 145 | 2/2000 |
| EP | 1 031 939 | 8/2000 |
| EP | 1031939 | 8/2000 |
| EP | 1 325 468 | 7/2003 |
| EP | 1 352 551 | 10/2003 |
| EP | 2 120 190 | 11/2009 |
| FR | 2 765 010 | 12/1998 |
| NL | 9100347 | 3/1992 |
| WO | WO 97/04415 | 2/1997 |
| WO | WO 98/09305 | 3/1998 |
| WO | WO 9953740 | 10/1999 |
| WO | WO 2006/125916 | 11/2006 |
| WO | WO 2007/025934 | 3/2007 |
| WO | WO 2007/026077 | 3/2007 |
| WO | WO 2009/142235 | 11/2009 |
| WO | WO 2010/029218 | 3/2010 |

OTHER PUBLICATIONS

Preliminary Short Product Information, SLE 66CLX360PE(M) Family, 8/16-Bit Security Dual Interface Controller for Contact Based and Contactless Applications, Infineon, Nov. 2006, 14 pages.
SLE 66 CX126PE, short Product Overview, May 2010, 4 pages.
SmartMX for programmable high-security, multi-application smart cards, NXP, 2009, 2 pages.
mifare DESFire Data Sheet Addendum, Preliminary specification, Revision 2.0, Apr. 2003, M086820_MF3ICD4O_ModuleSpec, 7 pages.
Smart Card, Wikipedia, Jul. 28, 2012, 10 pages.
ISO/IEC 14443, Wikipedia, Aug. 14, 2012, 2 pages.
ISO/IEC 7816, Wikipedia, Jul. 28, 2012, 6 pages.

Dual Interface (DI) Smart Card, and Readers

DI Smart Card

Booster Antenna BA with Coupler Coil CC

Coupler Coil counter-clockwise (CCW)
from outer *c* to inner *d*

Coupler Coil clockwise (CW)
from outer *c* to inner *d*

Coupler Coil clockwise (CW)
from inner *c* to outer *d*

Coupler Coil counter-clockwise
from inner *c* to outer *d*

AM in recess in CB, surrounded by CC
CC has smaller pitch than OW or IW
CC has more turns than OW or IW MA overlapping IW re-route both OW and IW, 90° enclosure re-route only IW, 90° enclosure re-route only IW, 180° enclosure re-route only IW, 360° enclosure ferrite incorporated into card body CB capacitive elements connected with booster antenna BA with a coupling antenna

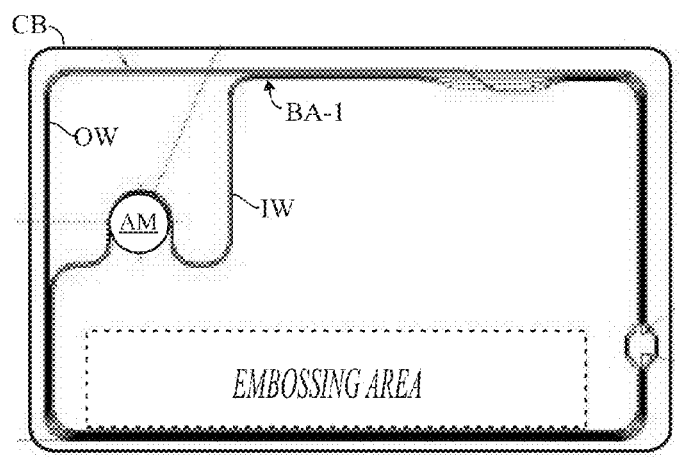
FIG. 5I
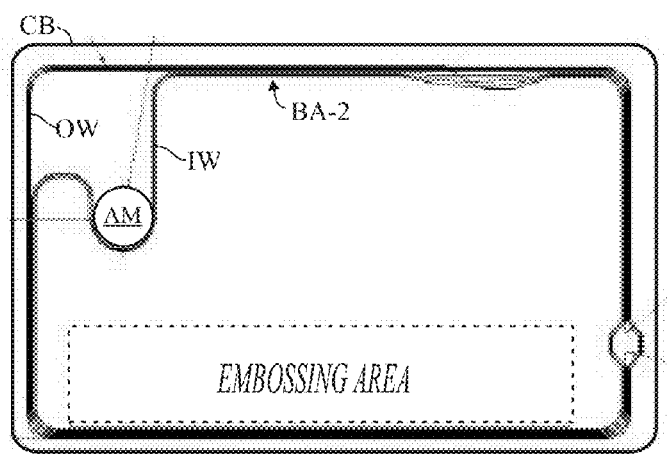
FIG. 5J
FIG. 5K
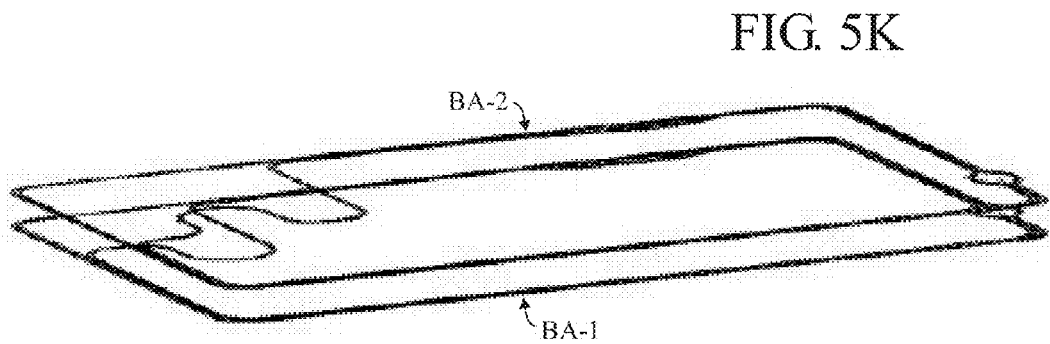

pitch increases across width of card body (CB)

zig-zag for increased capacitance dipole extending along 3 edges of periphery

US 8,991,712 B2

COUPLING IN AND TO RFID SMART CARDS

CROSS-REFERENCE(S) TO RELATED APPLICATIONS

This is a continuation-in-part of PCT/EP2012/065409 filed 7 Aug. 2012 ("S47 pct"), by Finn & Ummenhofer.
This is a continuation-in-part of the following U.S. applications . . .
Ser. No. 13/205,600 filed Aug. 8, 2011 ("S34") by Finn, which claims priority from . . .
   61/373,269 filed Aug. 12, 2010 ("s34ppa") by Finn
Ser. No. 13/310,718 filed Dec. 3, 2011 (US 2012/0074233, Mar. 29, 2012) ("S45") by Finn & Ummenhofer, which claims priority from . . .
   61/521,741 filed Aug. 9, 2011 ("s34pp2") by Finn
   61/533,228 filed Sep. 11, 2011 ("s34pp3") by Finn
   61/536,153 filed Sep. 19, 2011 ("s34pp4") by Finn
This application claims priority from the following U.S. provisionals . . .
   61/586,781 filed Jan. 14, 2012 ("s47 ppa") by Finn
   61/624,384 filed Apr. 15, 2012 ("s47pp2") by Finn

TECHNICAL FIELD

The invention relates to "secure documents" such as electronic passports, electronic ID cards and smart cards (data carriers) having RFID (radio frequency identification) chips or chip modules (CM) and operating in a contactless mode (ISO 14443) including dual interface (DI, or DIF) cards which can also operate in contact mode (ISO 7816-2), and more particularly to improving coupling between components within the smart card, such as between a module antenna (MA) connected with the RFID chip (CM) and a booster antenna (BA) in the card body (CB) of the smart card and inductively coupled with the module antenna (MA) and consequent improvements in the RFID chip (CM) interacting with external RFID readers.

BACKGROUND

For purposes of this discussion, an RFID transponder generally comprises a substrate, an RFID chip or chip module (CM) disposed on or in the substrate, and an antenna disposed on or in the substrate. The transponder may form the basis of a secure document such as an electronic passport, smart card or national ID card, which may also be referred to as "data carriers".

The RFID chip (CM) may operate solely in a contactless mode (such as ISO 14443), or may be a dual interface (DI, DIF) chip module (CM) which may additionally be operative to function in a contact mode (such as ISO 7816-2) and a contactless mode. The RFID chip (CM) may harvest energy from an RF signal supplied by an external RFID reader device with which it communicates.

The substrate, which may be referred to as an "inlay substrate" (such as for electronic passport) or "card body" (such as for smart card) may comprise one or more layers of material such as Polyvinyl Chloride (PVC), Polycarbonate (PC), polyethylene (PE), PET (doped PE), PET-G (derivative of PE), Teslin™, Paper or Cotton/Noil, and the like.

A chip module (CM) may be a leadframe-type chip module or an epoxy-glass type chip module. The epoxy-glass module can be metallized on one side (contact side) or on both sides with through-hole plating to facilitate the interconnection with the antenna.

An antenna, which may be referred to as a "card antenna" (CA), may be mounted to the inlay substrate using a sonotrode (ultrasonic tool) and electrically connected with the chip module (CM). See, for example U.S. Pat. No. 6,698,089 and U.S. Pat. No. 6,233,818, incorporated by reference herein. A typical pattern for a card antenna (CA) is generally rectangular, in the form of a flat (planar) coil (spiral) having a number of turns, disposed around the periphery of the substrate (or relevant portion thereof). See, for example, U.S. Pat. No. 7,980,477.

Rather than directly electrically connecting the RFID chip (CM) to a card antenna (CA), a module antenna (MA) may be incorporated into an antenna module (AM) comprising the RFID chip (CM) and the module antenna (MA). The module antenna (MA) may be quite small (such as approximately 15 mm×15 mm), in contrast with the card antenna (CA) (such as approximately 50 mm×80 mm).

U.S. Pat. No. 5,084,699 (Trovan, 1992) entitled Impedance Matching Coil Assembly For An Inductively Coupled Transponder. Attention is directed to FIG. 5. A coil assembly for use in an inductively powered transponder includes a primary coil (156) and a secondary coil (158) wrapped around the same coil forming ferrite rod (160). The primary coil's leads (162) are left floating while the secondary coil's leads (164) are connected to the integrated identification circuit of the transponder.

U.S. Pat. No. 5,955,723 (Siemens, 1999) entitled Contactless Chip Card discloses a data carrier configuration includes a semiconductor chip. Attention is directed to FIG. 1. A first conductor loop (2) is connected to the semiconductor chip (1) and has at least one winding and a cross-sectional area with approximately the dimensions of the semiconductor chip. At least one second conductor loop (3) has at least one winding, a cross-sectional area with approximately the dimensions of the data carrier configuration and a region forming a third loop (4) with approximately the dimensions of the first conductor loop (2). The third loop (4) inductively couples the first conductor loop (2) and the at least one second conductor loop (3) to one another.

U.S. Pat. No. 6,378,774 (Toppan, 2002) entitled IC Module and Smart Card. Attention is directed to FIGS. 12A,B and 17A,B. A smart card comprises an IC module and an antenna for non-contact transmission. The IC module has both a contact-type function and a non-contact-type function. The IC module and the antenna comprise first and second coupler coils, respectively, which are disposed to be closely coupled to each other, and the IC module and the antenna are coupled in a non-contact state by transformer coupling.

Toppan's antenna (4) comprises two similar windings (4a, 4b), which are shown in FIG. 17A disposed on opposite sides of a substrate (5), one substantially atop the other. A coupler coil (3) is associated with the card antenna (4). Another coupler coil (8) is associated with the chip module (6). As best viewed in FIGS. 12A and 12B, the two coupler coils (3, 8) are of approximately the same size and are disposed substantially one atop the other.

U.S. Pat. No. 7,928,918 (Gemalto, 2011) entitled Adjusting Resonance Frequency By Adjusting Distributed Inter-Turn Capacity discloses a method for adjusting frequency tuning of a resonant circuit with turns having a regular spacing generating stray inter-turn capacity.

US 2009/0152362 (Assa Abloy, 2009; issued as U.S. Pat. No. 8,130,166) discloses Coupling Device For Transponder And Smart Card With Such Device. Attention is directed to FIG. 6. A coupling device is formed by a continuous conductive path having a central section (12) and two extremity sections (11, 11'), the central section (12) forming at least a small spiral for inductive coupling with the transponder device, the extremities sections (11, 11') forming each one large spiral for inductive coupling with the reader device.

Assa Abloy '166 shows that the inner end of the outer extremity section (11) and the outer end of the inner extremity section (11') are connected with the coupler coil (12). The outer end (13) of the outer extremity section (11) and the inner end (13') of the inner extremity section (11') are left unconnected (loose).

US2010/0176205 (SPS, 2010) entitled Chip Card With Dual Communication Interface. Attention is directed to FIG. 4. A card body (22) includes a device (18) for concentrating and/or amplifying electromagnetic waves, which can channel the electromagnetic flow received, in particular, from a contactless chip card reader toward the coils of the antenna (13) of the microelectronic module (11). The device (18) for concentrating and/or amplifying electromagnetic waves may consist of a metal sheet disposed in the card body (22) below the cavity (23) receiving the microelectronic module (11), or may consist of an antenna consisting of at least one coil, disposed in the card body (22) below the cavity (23) receiving the microelectronic module (11).

All of the patents and publications referenced herein are "incorporated by reference", including the following: CA 2,279,176; DE 4311493; U.S. Pat. No. 6,142,381; U.S. Pat. No. 6,310,778; U.S. Pat. No. 6,406,935; U.S. Pat. No. 6,719,206; US 2009/0057414; US 2010/0283690; and US 2011/0163167.

SUMMARY

It is an object of the invention to provide improved techniques for improving coupling in and to RFID smart cards.

A data carrier such as a smart card comprising an antenna module (AM) and a booster antenna (BA). The booster antenna (BA) has an outer winding (OW) and an inner winding (IW), each of which has an inner end (IE) and an outer end (OE). A coupler coil (CC) is provided, connecting the outer end (OE, b) of the outer winding (OW) and the inner end (IE, e) of the inner winding (IW). The inner end (IE, a) of the outer winding (OW) and the outer end (OE, f) of the inner winding (IW) are left un-connected (free floating). The coupler coil (CC) may have a clockwise (CW) or counter-clockwise (CCW) sense which is the same as or opposite to the sense (CW or CCW) of the outer and inner windings.

The booster antenna (BA), which may be sandwiched between the outer layers and the printed layers of a smart card, electromagnetically couples with a module antenna (MA) of the antenna module (AM) in the card body (CB) to increase the read/write range between the data carrier and external readers.

In some embodiments of the invention, a data carrier component may comprise: a substrate (CB) having at least one surface and a periphery; and a booster antenna (BA) disposed on at least one surface of the substrate (CB) and extending around the periphery of the substrate (CB); wherein the booster antenna (BA) comprises an outer winding (OW) having an outer end (b) and an inner end (a) and an inner winding (IW) having an outer end (f) and an inner end (e); and a coupler coil (CC) disposed on the card body (CB) and having two ends (c, d), one of which is connected with the outer winding (OW), the other of which is connected with the inner winding (IW); and may be characterized in that: the one end (c) of the coupler coil (CC) is connected with the outer end (b) of the outer winding (OW); the other end (d) of the coupler coil (CC) is connected with the inner end (e) of the inner winding (IW); and the inner end (a) of the outer winding (OW) and the outer end (f) of the inner winding (IW) are left unconnected.

The coupler coil (CC) may exhibit a sense selected from two opposite senses, such as clockwise (CW) or counter-clockwise (CCW) which is opposite the sense of at least one of the outer winding (OW) and inner winding (IW). The coupler coil (CC) may have a greater number of turns than at least one of the outer winding (OW) and the inner winding (IW). The coupler coil (CC) may have a pitch which is not greater than the pitch of at least one of the outer winding (OW) and the inner winding (IW). In some embodiments, the one end (c) of the coupler coil (CC) is its outer end (OE), in other embodiments the other end (d) of the coupler coil (CC) is its outer end (OE).

An antenna module (AM) having a module antenna (MA) may be disposed in a recess of the card body (CB), within the interior of the coupler coil (CC), and may be substantially coplanar with the coupler coil (CC), so that the module antenna (MA) couples with the coupler coil (CC).

In some embodiments of the invention, a method of improving RF coupling between an external reader and a data carrier, the data carrier may comprise: providing a substrate (CB); providing a booster antenna (BA) on the substrate (CB) comprising an outer winding (OW) and an inner winding (IW) disposed around the periphery of the substrate (CB), and a coupler coil (CC) connected to ends of the outer winding (OW) and inner winding (IW); and providing an antenna module (AM) having an RFID chip (CM) and a module antenna (MA) on the substrate (CB); characterized in that: the booster antenna (BA) is configured as a quasi-dipole antenna with the outer winding (OW) and inner winding (IW) connected in reverse phase with one another.

BRIEF DESCRIPTION OF THE DRAWINGS

Reference will be made in detail to embodiments of the disclosure, non-limiting examples of which may be illustrated in the accompanying drawing figures (FIGs). The figures may be in the form of diagrams. Some elements in the figures may be exaggerated, others may be omitted, for illustrative clarity. Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

FIGS. 5I, 5J, 5K are diagrams (5I, 5J, plan view; 5K perspective view) a composite booster antenna having a first booster antenna (BA-1) on one side of a card body (CB) and a second booster antenna (BA-2) on an opposite side of the card body (CB).

DETAILED DESCRIPTION

Figure 1A:
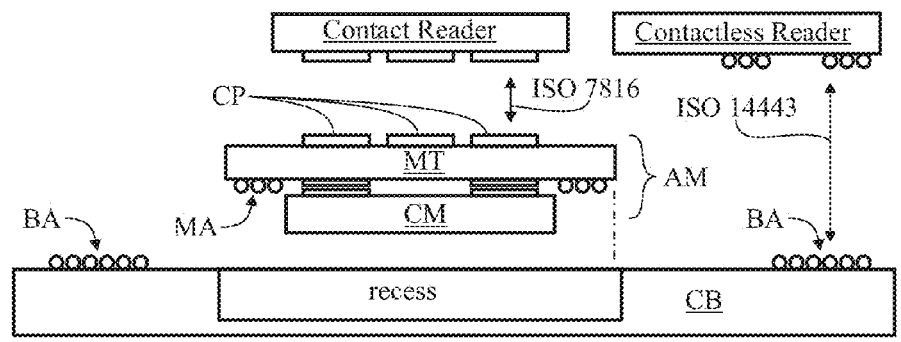
FIG. 1A is a cross-sectional view of a dual interface (DI) smart card.

Various embodiments will be described to illustrate teachings of the invention(s), and should be construed as illustrative rather than limiting. In the main hereinafter, transponders in the form of secure documents which may be smart cards or national ID cards may be discussed as exemplary of various features and embodiments of the invention(s) disclosed herein. As will be evident, many features and embodiments may be applicable to (readily incorporated in) other forms of secure documents, such as electronic passports. As used herein, any one of the terms "transponder", "smart card", "data carrier", and the like, may be interpreted to refer to any other of the devices similar thereto which operate under ISO 14443 or similar RFID standard.

A typical data carrier described herein may comprise (i) an antenna module (AM) having an RFID chip or chip module (CM) and a module antenna (MA), (ii) a card body (CB) and (iii) a booster antenna (BA) disposed on the card body (CB) to enhance coupling between the module antenna (MA) and the antenna of an external RFID "reader". When "chip module" is referred to herein, it should be taken to include "chip", and vice versa, unless explicitly otherwise stated. The module antenna (MA) may comprise a coil of wire, conductive traces etched or printed on a module tape (MT) substrate for the antenna module (AM), or may be incorporated directly on the chip itself.

The booster antenna (BA) may be formed by embedding wire in an inlay substrate or card body (CB). However, it should be understood that the antenna may be formed using a processes other than by embedding wire in a substrate, such as additive or subtractive processes such as printed antenna structures, coil winding techniques (such as disclosed in U.S. Pat. No. 6,295,720), antenna structures formed on a separate antenna substrate and transferred to the inlay substrate (or layer thereof), antenna structures etched (including laser etching) from a conductive layer on the substrate, conductive material deposited on the substrate or in channels formed in the substrate, or the like. When "inlay substrate" is referred to herein, it should be taken to include "card body", and vice versa, as well as any other substrate for a secure document, unless explicitly otherwise stated.

The descriptions that follow are mostly in the context of dual interface (DI, DIF) smart cards, and relate mostly to the contactless operation thereof. Many of the teachings set forth herein may be applicable to electronic passports and the like having only a contactless mode of operation. Generally, any dimensions set forth herein are approximate, and materials set forth herein are intended to be exemplary.

Generally, coupling between the module antenna (MA) and the antenna of an external RFID reader may be enhanced by incorporating a booster antenna (BA) on the card body (CB). In some respects, a booster antenna (BA) is similar to a card antenna (CA). However, in contrast with a card antenna (CA) which is directly electrically connected with the RFID chip or chip module (such as in U.S. Pat. No. 7,980,477), the booster antenna (BA) is inductively coupled with the module antenna (MA) which may be connected with the RFID chip (CM). Such inductive coupling may be more difficult to accomplish than a direct electrical connection.

As used herein, the term "coupling" (and variants thereof) refers to inductive, magnetic, capacitive or reactive coupling (including combinations thereof, any of which may be referred to as "inductive coupling") between two elements relying on the generation of an electromagnetic field by a given element and the reaction to (interaction with) the field(s) by another element. In contrast thereto, the term "connecting" (and variants thereof) refers to two elements being electrically connected with one another wherein the interaction between the two elements results from the flow of electrons between the two elements. Typically, two elements which are inductively coupled with one another are not electrically connected with one another. Elements which are coils of wire such as a module antenna MA and a coupler coil CC disposed near each other are generally inductively coupled with one another, without any electrical connection between the two elements. In contrast thereto, the module antenna MA is generally electrically connected with the RFID chip (CM) element. The windings and coils of the booster antenna BA, such as outer winding OW, inner winding IW and coupler coil CC elements, are generally electrically connected with one another, but may also exhibit inductive coupling with one another. The module antenna MA and coupler coil CC are not electrically connected with one another, but are inductively coupled (or "transformer coupled") with one another.

The booster antenna BA (and other features) disclosed herein may increase the effective operative ("reading") distance between the antenna module AM and an external contactless reader with capacitive and inductive coupling. With reading distances typically on the order of only a few centimeters, an increase of 1 cm can represent a significant improvement.

Figure 1B:
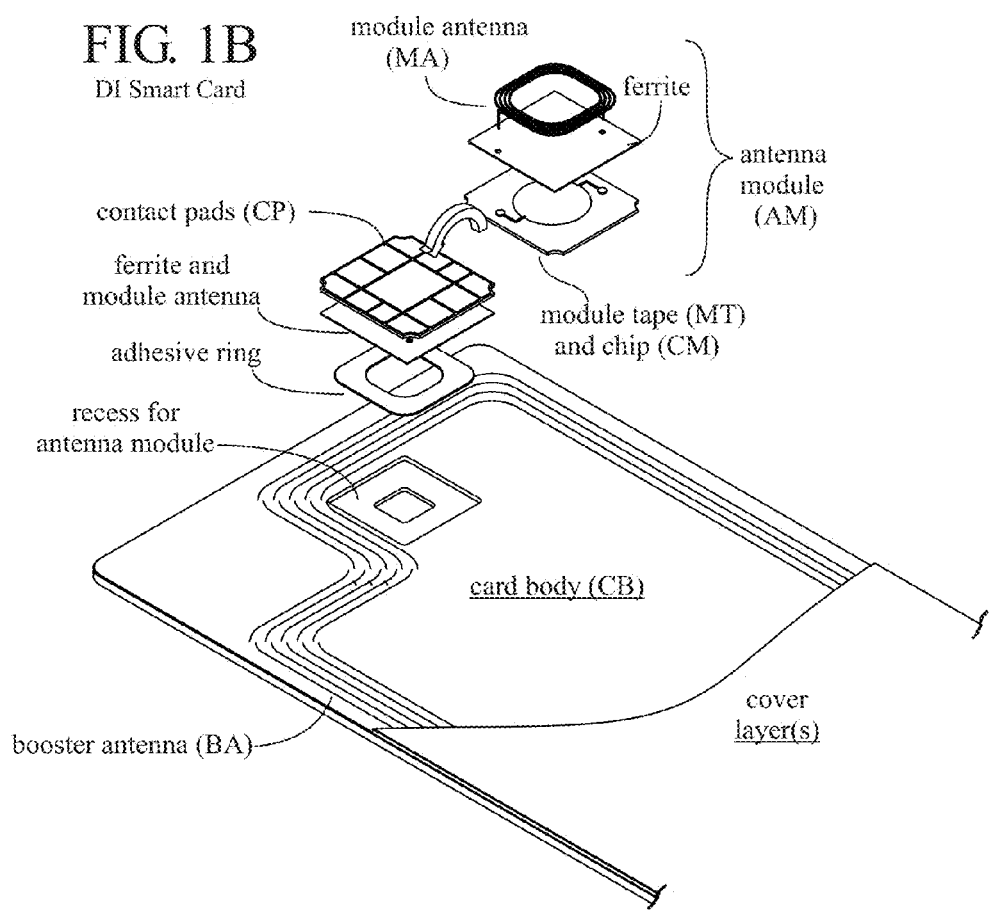
FIG. 1B is a perspective view of a dual interface (DI) smart card.

FIGS. 1A and 1B illustrates a DIF smart card comprising:
- an RFID chip or chip module CM, which may be a dual interface DI chip module, disposed on an underside of a substrate or module tape MT;
- a number (such as six) of contact pads CP for implementing a contact interface (ISO 7816) on a top side of the module tape MT; and
- a module antenna MA disposed on the underside of the module tape MT, typically formed from an etched conductor or wire, in a spiral (coil) pattern.
- The substrate MT supports and effects interconnections between the chip module CM, contact pads CP and module antenna MA, and may be single-sided, having metallization on only one side, or double-sided, having metallization on both sides.
- The chip module CM may be connected in any suitable manner, such as flip-chip connected (as illustrated in FIG. 1A) or wire bonded (not shown) to the module tape MT.
- As used herein, "chip module" includes one or more bare semiconductor dice (chips). A "hybrid" chip module may comprise a chip for contact interface and a chip for contactless interface, or the like. Reference is made to U.S. Pat. No. 6,378,774 (Toppan, 2002) for an example of a DIF chip solution, and to US 2010/0176205 (SPS, 2010) for an example of a two chip solution wherein one chip performs the contact function and the other chip performs the contactless function.

A ferrite element (film or layer) may be incorporated into the antenna module AM, between the contact pads CP and the module antenna MA to reduce attenuating effects which may be caused by the conductive contact pads CP.

Together, the chip module, CM, chip tape MT, contact pads CP and module antenna MA constitute an "antenna module" AM.

The smart card further comprises:

a substrate which for smart cards may be referred to as a "card body" CB. (For an electronic passport, the substrate would be an "inlay substrate".)

a booster antenna BA is shown disposed around (just within) the periphery of the card body CB, typically in the form of a rectangular, planar spiral having a number of turns.

As used herein, the term card body CB is intended to embrace any substrate supporting the booster antenna BA and receiving the antenna module AM. A recess may be provided in the card body CB for receiving the antenna module AM.

The smart card may be referred to as a "data carrier", or "transponder", or the like.

Some exemplary and/or approximate dimensions, materials and specifications may be:

Module Tape (MT): epoxy-based tape, 60 μm thick

Chip Module (CM): NXP SmartMx or Infineon SLE66, or other

Antenna Module (AM): 15 mm×15 mm and 300 μm thick

Module Antenna (MA): several windings of 50 μm copper wire, approximately the size of the chip module CM (and not greater in size then the AM). The module antenna MA may be a flat wound coil disposed on the glob-top mold mass of the chip module (CM).

Card body CB: approximately 54 mm×86 mm, 300 μm thick, polycarbonate (PC). The card body and its card antenna are significantly (such as 20 times) larger than the chip module CM and its module antenna MA.

ID-1 of the ISO/IEC 7810 standard defines cards as nominally 85.60 by 53.98 millimeters (3.370×2.125 in). Another popular size is ID-000 which is nominally 25 by 15 millimeters (0.984×0.591 in) (commonly used in SIM cards). Both are 0.76 millimeters (0.030 in) thick.

Booster Antenna BA: 3-12 turns of 112 μm copper, self-bonding wire, ultrasonically embedded in the card body CB. Alternatively, the booster antenna BA may comprise insulated 80 μm copper wire, disposed in a spiral pattern approximately 46 mm×76 mm (slightly smaller than the card), pitch of the turns 300 μm, exhibiting a resonant frequency of 13.56 MHz. The optimized self-resonance frequency of the booster antenna BA may be approximately 13~17 MHz.

To enhance coupling between the module antenna MA and the booster antenna BA, a material exhibiting electromagnetic coupling properties, such as ferrite, may be disposed as a thin film on surface of the card body CB or may be incorporated or embedded as particles in the card body, or both (film and particles), in any desired pattern. The use of ferrite as a material to enhance coupling or to shield (prevent) coupling is discussed herein as exemplary of a material exhibiting high electromagnetic permeability, often being used in one form or another in conjunction with antennas. See, for example, U.S. Pat. No. 5,084,699 (Trovan).

Additional layers (not shown), such as cover layers, may be laminated to the card body to complete the construction of the smart card.

FIG. 1B shows a DI smart card having a card body CB, a booster antenna BA disposed on the card body CB, an antenna module AM disposed in a recess in the card body CB near a portion of the booster antenna BA. Generally, the position of the antenna module (AM), particularly the contact pads (CP), at an interior of the card body (CB), away from the periphery and avoiding embossing areas and the like, may be prescribed by the relevant ISO specification.

FIG. 1A further illustrates a contact reader having contacts for interacting (providing power and exchanging data) with the chip module CM via the contact pads CP in a contact mode (ISO 7816), and a contactless reader having an antenna for interacting with the chip module CM via the card antenna CA and the module antenna MA.

Quasi-Dipole Booster Antenna (BA)

Figure 2A:
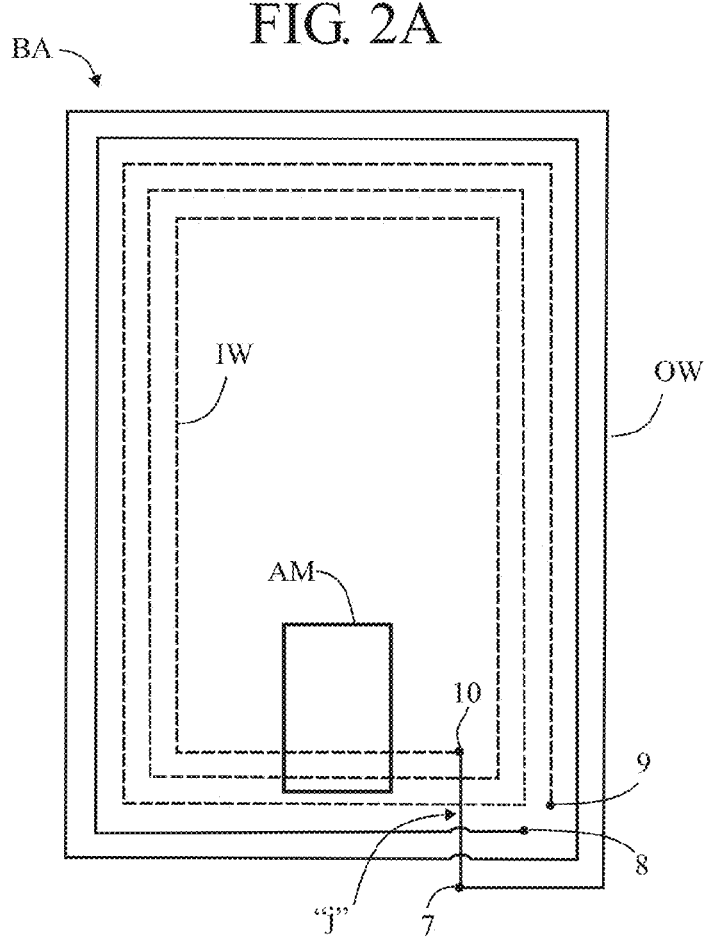
FIG. 2A is a diagram (plan view) of a configuration of a quasi-dipole booster antenna (BA), with an antenna module (AM) located for inductively coupling therewith.

FIG. 2A illustrates a booster antenna BA antenna in the overall form of a substantially planar, generally rectangular spiral of wire embedded in a an inlay substrate or card body (CB, not shown) and comprising two distinct portions (or windings, or antenna structures, or "poles"), as follows . . .

an outer winding OW having a few turns of wire, an outer end 7 and an inner end 8 an inner winding IW having a few turns of wire, an outer end 9 and an inner end 10 note that the inner winding IW is shown as a dashed line, for illustrative contrast with the outer winding OW (solid line), and may have substantially the same number of turns as the outer winding OW.

each of the outer winding OW inner winding IW may have an overall length of approximately 1200 mm. The inner and outer windings have substantially the same length as one another.

The outer winding OW and the inner winding IW are connect as a "quasi dipole" antenna with "reverse phase". The outer end 7 of the outer winding OW is connected with the inner end 10 of the inner winding IW, in any suitable manner, such as by using a separate jumper "j" or conductive trace within the substrate (CB). The inner end 8 of the outer winding OW and the outer end 9 of the inner winding IW are left unconnected.

The outer and inner windings OW, IW may be inductively coupled in close proximity with one another and voltages induced in the outer and inner windings OW, IW may have opposite phase from one another. The outer and inner windings OW, IW may be formed in the same layer as one another with the inner winding IW disposed interior of the outer winding OW, or they may be formed in layers of the substrate overlying each other, substantially aligned with one another. The outer and inner windings OW, IW may be formed as flat coils of embedded wire, or other than embedded wire, having a number of turns and an overall length of approximately 1200 mm.

The booster antenna BA may be formed in a substrate (or card body) using conventional wire embedding techniques (a sonotrode with ultrasonic, such as described in U.S. Pat. No. 6,233,818), for example as follows:

start embedding the wire at the position 9 (outer end of inner winding IW) and continue embedding to the position 10 (inner end of inner winding IW), thus forming the few (such as 2, 3 or 4) turns of the inner antenna winding IW stop embedding (turn off the ultrasonics, lift the sonotrode), and in a next step, route (guide) the wire over the turns of the inner winding IW to the position 7, which will be the outer end of the outer winding OW, without cutting the wire.

This jumping over the inner winding IW eliminates the need to have a separate connection bridge or jumper ("j") connecting end 10 of the outer winding D with inner end 7 of the inner winding E. (here, "7" and "10" are positions, not ends.)

resume embedding at the position 7 (the outer end of the outer winding OW), and continue, forming the few (such as 2, 3 or 4) turns of the outer winding OW, jumping over the already-laid integral jumper "j" if necessary.

The outer end 9 of the inner winding IW and the inner end 8 of the outer winding OW may be left as free ends, not connected with anything. This is typical of a dipole antenna. By connecting the outer winding OW and inner winding IW in this manner (inner end 10 of inner winding IW to outer end 7 of outer winding OW, or "reverse phase"), the outer and inner windings OW, IW are coupled in close proximity and the effect is additive since the induced voltage of the inner winding IW may exhibit opposite phase (phase inversion) than the voltage induced in the outer winding OW. Reactive coupling (capacitance and inductance) of the inner outer winding OW and the inner winding IW may permit the booster antenna CA to be realized with fewer turns than would otherwise be possible.

The connection of an outer and inner windings OW, IW to form a "quasi-dipole" card antenna exhibiting phase inversion is easily contrasted with either of U.S. Pat. No. 6,378,774 (Toppan) and US2009/0152362 (Assa Abloy).

Note, for example, in Assa Abloy, which discloses two "extremity sections" 11 and 11' (corresponding to the outer winding D and inner winding E), the outer end of the outer extremity section 11 and the inner end of the inner extremity section 11' (corresponding to the ends or positions 7 and 10 of the card antenna CA) are left unconnected. The inner end of the outer extremity section 11 and the outer end of the inner extremity section 11' (corresponding to the ends 8 and 9 of the card antenna CA, which are left unconnected) are connected with a central section 12 forming at least a small spiral for inductive coupling with the transponder device (corresponding to the antenna module AM). Note in FIG. 2A that there is no analogous coupling coil, coupling is effected by disposing the antenna module AM directly over (onto) a portion of the card antenna CA, as discussed in greater detail hereinbelow.

Toppan also requires a separate coupling coil (3)

The outer winding OW and inner winding IW may be formed as one continuous structure, without a separate jumper or trace, using conventional wire embedding techniques, for example as follows:

start embedding the wire at the position 9 (outer end of inner winding) and continue embedding to the position 10, thus forming the few (such as 2, 3 or 4) turns of the inner winding (IW)

stop embedding (turn off the ultrasonics, lift the sonotrode), and in a next step, route (guide) the wire over the turns of the inner winding IW to the position 7, which will be the outer end of the outer winding OW, without cutting the wire. This jumping over the inner winding IW eliminates the need to have a separate jumper connecting the ends 7 and 10 of the outer and inner windings. Here, "7" and "10" represent positions corresponding to respective outer and inner ends of the outer and inner windings.

The portion "j" of wire between positions 7 and 10 may be referred to as a "connection bridge" or "integral jumper". (If the two windings OW and IW are not integral with one another, a separate "jumper" would be used to connect the ends 7 and 10.)

after jumping over the inner winding IW, resume embedding at the position 7, and continue, forming the turns of the outer winding OW, jumping over the already-laid connection bridge "j" as may be necessary.

Figure 2B:
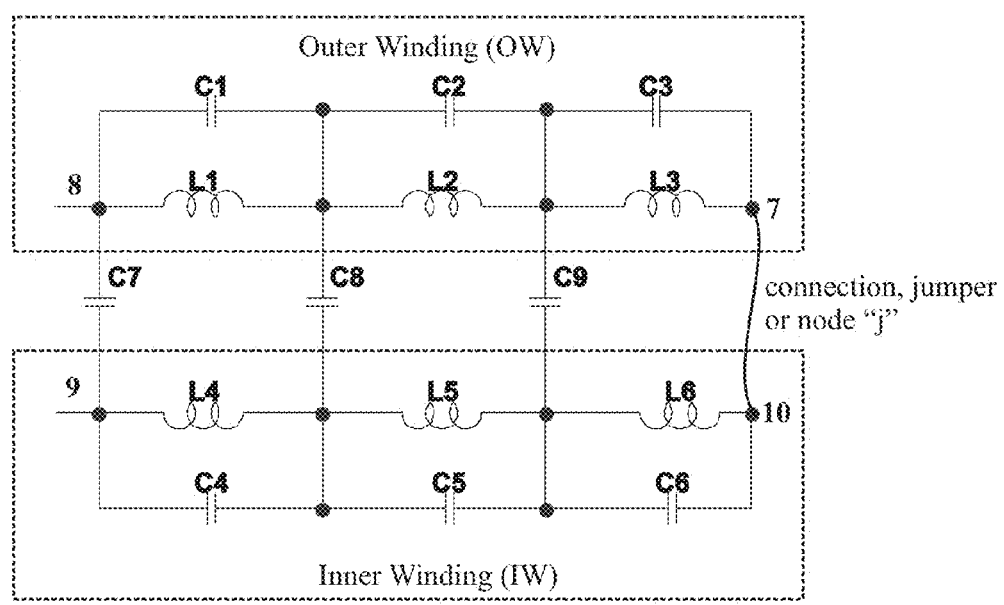
FIG. 2B is an equivalent circuit for the quasi-dipole booster antenna (BA) shown in FIG. 2A.

In combination with a commercially-available chip module (such as NXP SmartMx or Infineon SLE66, or other) which may be specified with an input capacitance of approximately 10~30 pF the assembled transponder can be matched to a resonance frequency of 13~17 MHz. See, for example, the following, incorporated by reference herein:

Product short data sheet, P5CD016/021/041/051 and P5Cx081 family, Secure dual interface and contact PKI smart card controller, Rev 3.2—March 2011, 20 pages Preliminary Short Product Information, SLE 66CLX360PE(M) Family, 8/16-Bit Security Dual Interface Controller For Contact Based and Contactless Applications, Infineon, November 2006, 14 pages SLE 66 CX126PE, short Product Overview, May 2010, 4 pages SmartMX for programmable high-security, multi-application smart cards, NXP, 2009, 2 pages, mifare DESFire Data Sheet Addendum, Preliminary specification, Revision 2.0, April 2003, 7 pages M086820_MF3ICD40_ModuleSpec FIG. 2B illustrates, schematically, the booster antenna BA consisting of an outer winding OW and an inner winding IW, and is intended as a non-limiting example for describing how the booster antenna BA may function. In this example, the outer winding OW has 3 turns modeled by inductances L1, L2 and L3, and the inner winding IW has 3 turns modeled by inductances L4, L5 and L6. All inductances (L) are influenced by the coupling between all coils. The capacitances C1~C6 are the coil inherent stray capacitances.

The capacitances C7~C9 describe the interaction between the outer and inner windings OW, IW in case of tight coupling between the outer and inner windings OW, IW. These additional capacitances reduce the self-resonance frequency of the booster antenna BA and may make an additional capacitive component unnecessary. The capacitances (C) can be influenced by wire pitch, the inductances (L) by the number of turns.

Although not shown, it is within the scope of the invention that capacitive elements may be incorporated on the card body CB, such as in the form of conductive material disposed on a top and bottom surface thereof, and may be electrically connected with the free ends 8, 9 of the booster antenna BA. A ferrite element (patch or layer) may be incorporated on the card body CB in the area of the coupler coil.

The quasi-dipole booster antenna BA is intended to work with an antenna module AM functioning in the contactless mode, including but not limited to DIF modules, and also including semiconductor chips having their own "on chip" antennas (such as disclosed in U.S. Pat. No. 6,373,447). The outer and inner windings OW, IW of the booster antenna BA should have substantially the same number of turns (such as 2-3 turns each), the same length (such as 1200 mm) and substantially the same pitch as one another, and be spaced as closely as possible to each other over much of their perimeter.

The outer and inner windings OW, IW may be oriented with (exhibit) the same "sense" (clockwise or counter-clockwise) as one another. Variations in any of these parameters (length, pitch, spacing, sense) are of course possible, some of which are discussed herein.

The antenna wire can be made of copper wire, doped copper wire, copper nickel wire, copper thin wire, silver wire or a variety of wire alloys. The thickness of the insulation and/or self-bonding coating can be designed to control the inter-winding capacitance. For example, by increasing the capacitance, the Q factor of the booster antenna BA can be optimized. By adding an alloy to the composition of the copper wire, its resistance can be changed. The diameter of the wire (80, 112 150 microns) may also be selected to control capacitance and Q factor.

FIG. 2A shows a non-limiting example of how the antenna module AM may be positioned with respect to the booster antenna BA, for inductively coupling therewith. The antenna module AM comprises a DIF chip module CM and module antenna MA for contactless mode, and contact pads CP for contact mode. The antenna module AM is shown rectangular, but it may be round. The module antenna MA within the antenna module AM may also be rectangular, or round.

In this example, the antenna module AM is shown disposed (positioned in the smart card) so that the at least one of the four side edges of the module antenna MA overlaps at least some of the turns of only the inner winding IW of the booster antenna BA, for efficient coupling thereto (preferably without also overlapping any of the outer winding OW). Alternatively, the antenna module AM, particularly its module antenna MA, may overlap the outer winding OW rather than the inner winding IW of the booster antenna BA. However, it is considered to be important that the antenna module AM, particularly its module antenna MA, does not overlap both of the inner winding IW and the outer winding OW.

The arrangement of the antenna module AM with its module antenna MA physically overlapping and directly coupling to a two winding card antenna CA is in stark contrast with U.S. Pat. No. 6,378,774 (Toppan) and US2009/0152362 (Assa Abloy), both of which rely on a separate coupler coil in addition to a two winding card antenna to effect coupling with the module antenna. This direct coupling feature of the invention is attributable to the way the inner winding IW is connected with the outer winding OW so that they are "reverse phased", and overlapping the module antenna MA onto only one or the other of the inner and outer windings.

Booster Antenna (BA) with Coupler Coil (CC)

NL 9100347 (1992, Nedap) discloses a contactless card having the following elements arranged as shown in FIG. 1; (1) geintegreerde schakeling (integrated circuit); (2) electronische schakeling (electronic circuit); (3) transformator (transformer); (4) kernmateriaal (core material); (5) condensator (condenser); (6) primaire spoel (primary coil) and (7) antennespoel (antenna coil)

As is evident from FIG. 1 of the Nedap patent, the electronic circuit (2, comparable to the chip CM herein) is connected with a first coil (3, comparable to the module antenna MA herein). A second coil (6, comparable to the coupling coil CC herein) is connected with the main antenna (1, comparable to the card antenna CA herein). The first coil (3, MA) is coupled with the second coil (6, CC), as aided by the core material (4).

Figure 3:
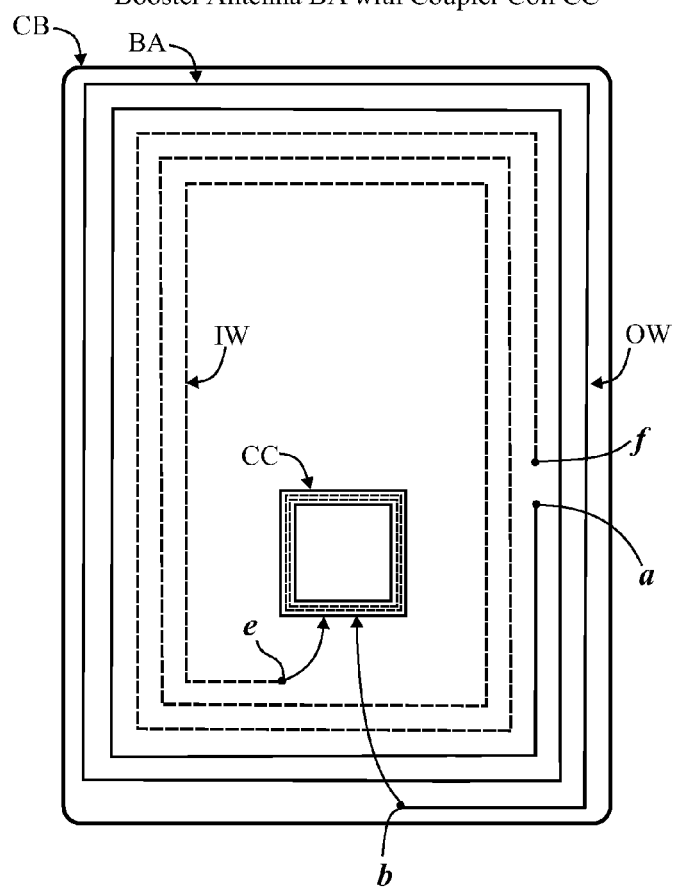
FIG. 3 is a diagram (plan view) of a configuration of a quasi-dipole booster antenna (BA), showing a coupler coil (CC) incorporated therewith.

U.S. Pat. No. 5,955,723 (1999, Siemens) discloses a contactless chip card. A data carrier configuration includes a semiconductor chip (1). A first conductor loop (small coil, 2) is connected to the semiconductor chip and has at least one winding and a cross-sectional area with approximately the dimensions of the semiconductor chip. At least one second conductor loop (large coil, 3) has at least one winding, a cross-sectional area with approximately the dimensions of the data carrier configuration and a region forming a third loop (4) with approximately the dimensions of the first conductor loop. The third loop (4) inductively couples the first conductor loop (2) and the at least one second conductor loop (3) to one another. The first (2) and third (4) conductor loops are disposed substantially concentrically. FIG. 3 shows a further possible configuration of a coupling region between a small conductor loop (2) connected to a semiconductor chip (1), and a large conductor loop (3). In this case, the coupling region has a meandering path, in order to obtain as long a length of the coupling region as possible.

U.S. Pat. No. 8,130,166 (2009/0152362; Assa Abloy) discloses a coupling device for transponder is formed by a continuous conductive path having a central section and two extremity sections, the central section forming at least a small spiral for inductive coupling with the transponder device, the extremities sections forming each one large spiral for inductive coupling with the reader device, wherein the small spiral shows a larger pitch than the ones of the large spirals, and wherein the two extremities of the continuous path are loose such that the coupling device forms an open circuit.

As is evident from the above (Nedap, Siemens, Assa Abloy), it is well known to couple an integrated circuit (herein referred to as a chip or chip module CM) with an antenna element (herein referred to as a card antenna CA or booster antenna BA) on a card substrate (herein referred to as card body CB) by coupling a first coil (herein referred to as a module antenna MA) which is connected with the CM to a second coil (herein referred to as a coupling coil CC) which is connected with the booster antenna BA.

Quasi-Dipole Booster Antenna BA with Coupler Coil CC

FIG. 3 shows a booster antenna BA comprising an outer winding OW and an inner winding IW, both extending substantially around the periphery of the card body CB. Each of the inner and outer windings has an inner end (IE) and an outer end (OE). Regarding the outer winding OW and inner winding IW, the booster antenna BA of FIG. 3 may be substantially identical to the booster antenna BA of FIG. 2A. However, in the booster antenna of FIG. 3, the outer end OE (b) of the outer winding OW is connected with the inner end IE (e) of the inner winding IW, via a coupler coil CC. (In this regard, the coupler coil CC may be thought of as "substituting" for the jumper "j" of FIG. 2A in that it makes the electrical connection between b/7 and e/10.) The inner end IE (a) of the outer winding OW and the outer end OE (f) of the inner winding IW may be left unconnected, as "free ends". (Compare 8, 9 in FIG. 2A) The overall booster antenna BA comprising outer winding OW, coupler coil CC and inner winding IE is an open circuit, and may be referred to as a "quasi-dipole"—the outer winding OW constituting one pole of the dipole, the inner winding IW constituting the other pole of the dipole—center fed by the coupler coil CC.

The booster antenna BA may be formed using insulated, discrete copper wire disposed (such as ultrasonically bonded) around (inside of) the perimeter (periphery) of a card body CB (or inlay substrate, or data carrier substrate, such as formed of thermoplastic). The booster antenna BA comprises an outer winding OW (or coil, D) and an inner winding IW (or coil, D), and further comprises a coupler coil CC, all of which, although "ends" of these various coil elements are described, may be formed from one continuous length of wire (such as 80 µm self-bonding wire) which may be laid upon or embedded in the card body CB. More particularly, The outer winding OW (compare D, FIG. 1A) may be formed as a spiral having a number (such as 2-3) of turns and having an inner end IE at point "a" and an outer end OE at point "b". The outer winding OW is near (substantially at) the periphery (perimeter) of the card body CB. The inner end IE ("a") of the outer winding OW is a free end.

The coupler coil CC may be formed as a spiral having a number (such as approximately 10) of turns and having two ends "c" and "d". The end "c" may be an outer end OE or an inner end IE, the end "d" may be an inner end IE or an outer end OE, as described with respect to the embodiments shown in FIGS. 3A, 3B, 3C, 3D. The coupler coil CC is disposed at an interior portion of the card body CB, away from the periphery, and is shown only generally with a few dashed lines in FIG. 3.

The inner winding IE may be formed as a spiral having a number (such as 2-3) of turns and having an inner end IE "e" and an outer end OE "f". The inner winding IW is near (substantially at) the periphery of the card body CB, inward of the outer winding OW. The outer end OE ("f") of the inner winding IW is a free end. In FIG. 3, the inner winding IW is shown in dashed lines, for illustrative clarity.

The inner end IE of the outer winding OW is a "free end" in that it is left unconnected. Similarly, the outer end OE of the inner winding IW is a "free end" left unconnected.

The outer winding OW, coupler coil CC and inner winding IW may be formed as one continuous structure, using conventional wire embedding techniques. It should be understood that references to the coupler coil CC being connected to ends of the outer winding (OW) and inner winding (IW) should not be construed to imply that coupler coil CC is a separate entity having ends. Rather, in the context of forming one continuous structure of outer winding OW, coupler coil CC and inner winding IW, "ends" may be interpreted to mean positions corresponding to what otherwise would be actual ends—the term "connected to" being interpreted as "contiguous with" in this context.

The dimensions of the card body CB may be approximately 54 mm×86 mm. The outer dimension of the outer winding OW of the booster antenna BA may be approximately 80×50 mm. The wire for forming the booster antenna BA may having a diameter (d) of approximately 100 µm (including, but not limited to 80 mm, 112 µm, 125 µm.

The inner winding IW may be disposed within the outer winding OW, as illustrated, on a given surface of the card body CB (or layer of a multi-layer inlay substrate). Alternatively, these two windings of the booster antenna BA may be disposed on opposite surfaces of the card body CB, substantially aligned with one another (in which case they would be "top" and "bottom" windings rather than "outer" and "inner" windings. The two windings of the booster antenna BA may be coupled in close proximity so that voltages induced in them may have opposite phase from one another. The coupler coil CC may be on the same surface of the card body CB as the outer and inner windings.

The turns of the outer winding OW and inner winding IW of the booster antenna BA may be at a pitch of 0.2 mm (200 µm), resulting in a space of approximately one wire diameter between adjacent turns of the outer winding OW or inner winding IW. The pitch of the turns of the coupler coil CC may be substantially the same as or less than (stated otherwise, not greater than) the pitch of turns of at least one of the outer winding OW and inner winding IW—for example 0.15 mm (150 µm), resulting in space smaller than one wire diameter between adjacent turns of the coupler coil (CC). Self-bonding copper wire may be used for the booster antenna BA. The pitch of both the outer/inner windings OW/IW and the coupler coil CC may both be approximately 2× (twice) the diameter of the wire (or width of the conductive traces or tracks), resulting in a spacing between adjacent turns of the spiral(s) on the order of 1 wire diameter (or trace width). The pitches of the outer winding OW and the inner winding IW may be substantially the same as one another, or they may be different than each other.

It is within the scope of the invention that more turns of wire for the coupler coil CC can be accommodated in a given area—for example, by laying two "courses" of wire, one atop the other (with an insulating film therebetween, if necessary), in a laser-ablated trench defining the area for the turns of the coupler coil CC.

A substrate or card body CB with the booster antenna BA formed thereon may be prepared by a first manufacturer and constitute an interim product (which, without the antenna module AM, may be referred to as a "data carrier component"). Subsequently, a second manufacturer may mill (or otherwise form) a recess in the card body CB, at the interior of the coupler coil CC (see FIG. 4) and install the antenna module AM (with its module antenna MA) in the recess. (Of course, the data carrier component can be provided by the first manufacturer, with the recess already formed.)

In FIG. 3, the coupler coil CC is shown without detail, represented by a few dashed lines. Some details of its construction, and how is my be connected with the outer winding OW and inner winding IW are set forth in FIGS. 3A-3D.

Notes

CB—Card Body or Inlay Substrate
BA—Booster Antenna or Card Antenna (CA)
OW—Outer Winding of BA—approx. 2-3 turns
IW—Inner Winding of BA—approx. 2-3 turns
CC—Coupler Coil—approx. 10 turns
IE—Inner End of OW, IW or CC
OE—Outer End of OW, IW or CC
Inner End (IE, a) of Outer Winding (OW) is "free end"
Outer End (OE, f) of Inner Winding (IW) is "free end"
Outer End (OE, b) of OW connected to one end of CC
Inner End (IE, e) of IW connected to another end of CC
OW shown laid clockwise (CW) from IE (a) to OE (b)
IW shown laid clockwise (CW) from IE (e) to OE (f)
For details of the Coupler Coil (CC), refer to FIGS. 3A, 3B, 3C, 3D FIGS. 3A-3D illustrate various embodiments for the booster antenna BA, more particularly various configurations for the coupler coil CC element. The descriptions will be in the context of starting laying an antenna wire at the point "a", and continuing through the points "b", "c", "d", "e" and "f", in which case the outer winding OW and inner winding IW both exhibit a clockwise CW sense. If the wire were laid starting at the point "f" and finishing at the point "a", the outer winding OW and inner winding IW would both exhibit a counter-clockwise sense. The sense (CW or CCW) of the coupler coil CC may be the same as (FIGS. 3B, 3C) or opposite from (FIGS. 3A, 3D) the sense of the outer winding OW and inner winding IW.

It should be understood that the booster antenna BA could be made with other than wire using additive processes such as printing conductive material onto the substrate CB, or subtractive processes such as etching conductive material away from the substrate CB. For such non-wire antennas, although there may be no actual direction such as is inherent with laying or embedding the wire (the course of laying the wire, from one end to the other), but the resulting spiral elements OW, IW, CC of the booster antenna BA may nevertheless exhibit a clockwise CW or counter-clockwise CCW "virtual sense" (or orientation) which can be determined by analogy to laying wire. (For an additive process such as inkjet printing, which is sequential, the sense would be actual.) The "sense" can be determined by following the pattern from "a" to "f", or from "f" to "a".

As used herein, "pitch" may refer to the average distance, center-to-center (c-c), between adjacent turns of a wire for a winding (OW, IW) or the coupler coil (CC), as it is being laid. (Or, by analogy, to the center-to-center distance between adjacent conductive tracks made by additive or subtractive processes). It should be understood that during manufacturing (including as a result of subsequent manufacturing steps such as laminating), the pitch of the wire may vary or change somewhat, such as +/−5%, or more. And, when going around a corner, such as in a rectangular spiral, the pitch may be somewhat indeterminate. It should also be understood that the pitch of the windings (OW, IW) or coupler coil (CC) may be advertently altered (typically increased) locally, such as at the free ends "a" and "f", to accommodate manufacturing processes (such as starting and ending embedding the wire) and the like. "Pitch" may refer to the initial (during laying) or final (after laminating) distance (c-c) between adjacent turns of a winding.

Figure 3A:
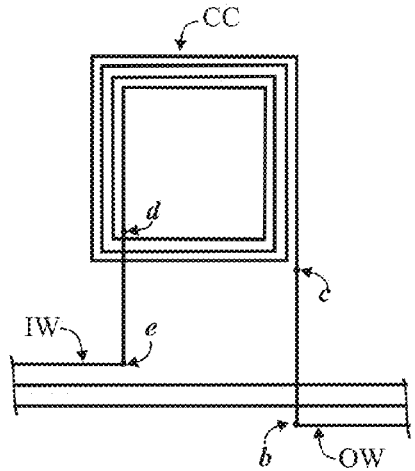
FIGS. 3A, 3B, 3C, 3D are diagrams (plan view) of configurations for the coupler coil (CC) shown in FIG. 3.

FIG. 3A shows a relevant portion of a booster antenna BA (FIG. 3), and shows laying the booster antenna BA by . . .
  starting at a point "a" (not shown, see FIG. 3) which is the inner end IE of the outer winding OW, start laying the wire, in a clockwise (CW) direction around (just within) the perimeter of the card body, a few turns, spiraling outward until the point "b" which is the outer end OE of the outer winding OW;
  at the point "b", guide the wire inward towards the interior of the card body CB to the point "c" which is the outer end OE of the coupler coil CC, if necessary crossing over already laid turns of the outer winding OW;
  from the point "c", continue laying the wire in a counter-clockwise CCW direction a few turns, spiraling inward to the point "d" which is the inner end IE of the coupler coil CC;
  at the point "d", guide the wire outwards towards the periphery of the card body CB to the point "e" which is the inner end IE of the inner winding IW; and
  from the point "e", continue laying the wire in a clockwise CW direction a few turns, spiraling outward to the point "f" (not shown, see FIG. 3) which is the outer end OE of the inner winding IW.

The resulting outer winding OW and inner winding IW have the same sense (CW) as each other. The coupler coil CC is laid from outer-to-inner, spiraling inward from its outer end OE (c) to its inner end IE (d) with a sense (CCW) which is opposite from the sense (CW) of the outer and inner windings OW, IW.

Figure 3B:
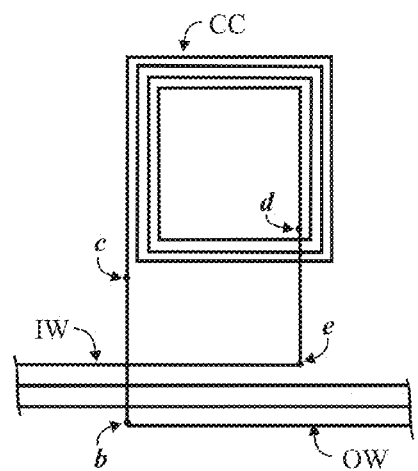

FIG. 3B shows a relevant portion of a booster antenna BA (FIG. 3), and shows laying the booster antenna BA by . . .
  starting at a point "a" (not shown, see FIG. 3) which is the inner end IE of the outer winding OW, start laying the wire, in a clockwise (CW) direction around (just within) the perimeter of the card body, a few turns, spiraling outward until the point "b" which is the outer end OE of the outer winding OW;
  at the point "b", guide the wire inward towards the interior of the card body CB to the point "c" which is the outer end OE of the coupler coil CC, if necessary crossing over already laid turns of the outer winding OW;
  from the point "c", continue laying the wire in a clockwise CW direction a few turns, spiraling inward to the point "d" which is the inner end IE of the coupler coil CC;
  at the point "d", guide the wire outwards towards the periphery of the card body CB to the point "e" which is the inner end IE of the inner winding IW; and
  from the point "e", continue laying the wire in a clockwise CW direction a few turns, spiraling outward to the point "f" (not shown, see FIG. 3) which is the outer end OE of the inner winding IW.

The resulting outer winding OW and inner winding IW have the same sense (CW) as each other. The coupler coil CC is laid from outer-to-inner, spiraling inward from its outer end OE (c) to its inner end IE (d) with a sense (CW) which is the same as the sense (CW) of the outer and inner windings OW, IW.

Figure 3C:
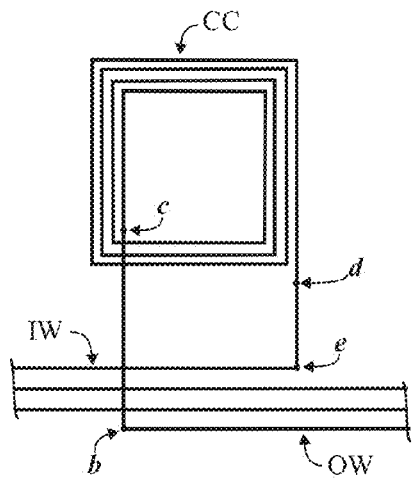

FIG. 3C shows a relevant portion of a booster antenna BA (FIG. 3), and shows laying the booster antenna BA by . . .
  starting at a point "a" (not shown, see FIG. 3) which is the inner end IE of the outer winding OW, start laying the wire, in a clockwise (CW) direction around (just within) the perimeter of the card body, a few turns, spiraling outward until the point "b" which is the outer end OE of the outer winding OW;
  at the point "b", guide the wire inward towards the interior of the card body CB to the point "c" which is the inner end IE of the coupler coil CC, if necessary crossing over already laid turns of the outer winding OW;
  from the point "c", continue laying the wire in a clockwise CW direction a few turns, spiraling outward to the point "d" which is the outer end OE of the coupler coil CC;
  at the point "d", guide the wire outwards towards the periphery of the card body CB to the point "e" which is the inner end IE of the inner winding IW; and
  from the point "e", continue laying the wire in a clockwise CW direction a few turns, spiraling outward to the point "f" (not shown, see FIG. 3) which is the outer end OE of the inner winding IW.

The resulting outer winding OW and inner winding IW have the same sense (CW) as each other. The coupler coil CC is laid from inner-to-outer, spiraling outward from its inner end IE (c) to its outer end OE (d) with a sense (CW) which is the same as the sense (CW) of the outer and inner windings OW, IW.

Figure 3D:
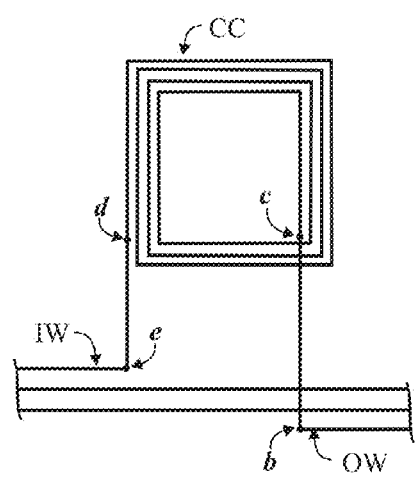

FIG. 3D shows a relevant portion of a booster antenna BA (FIG. 3), and shows laying the booster antenna BA by . . .
  starting at a point "a" (not shown, see FIG. 3) which is the inner end IE of the outer winding OW, start laying the wire, in a clockwise (CW) direction around (just within) the perimeter of the card body, a few turns, spiraling outward until the point "b" which is the outer end OE of the outer winding OW;
  at the point "b", guide the wire inward towards the interior of the card body CB to the point "c" which is the inner end IE of the coupler coil CC, if necessary crossing over already laid turns of the outer winding OW;
  from the point "c", continue laying the wire in a counter-clockwise CCW direction a few turns, spiraling outward to the point "d" which is the outer end OE of the coupler coil CC;
  at the point "d", guide the wire outwards towards the periphery of the card body CB to the point "e" which is the inner end IE of the inner winding IW; and from the point "e", continue laying the wire in a clockwise CW direction a few turns, spiraling outward to the point "f" (not shown, see FIG. 3) which is the outer end OE of the inner winding IW.

The resulting outer winding OW and inner winding IW have the same sense (CW) as each other. The coupler coil CC is laid from inner-to-outer, spiraling outward from its inner end IE (c) to its outer end OE (d) with a sense (CCW) which is opposite from the sense (CW) of the outer and inner windings OW, IW.

An antenna module AM may be mounted in on the card body CB so that its module antenna MA is closely adjacent the coupler coil CC, for coupling therewith. The antenna module AM may be disposed with its module antenna MA overlapping the coupler coil CC, or with its module antenna completely within the interior of the coupler coil CC, or with entirely within the coupler coil CC. The antenna module AM may be installed in a milled cavity on the card body CB so that its module antenna MA may be substantially coplanar with the coupler coil CC. The module antenna MA may be at a different level than (not coplanar with) the coupler coil CC.

The module antenna MA for the antenna module AM may also be a coil of wire wound with either a clockwise (CW) or counter-clockwise (CCW) sense. The module antenna MA may have the same sense (CW, or CCW) as the coupler coil CC. The module antenna MA may have the opposite sense (CW, or CCW) as the coupler coil CC. The module antenna MA may have the same sense (CW, or CCW) as the outer winding OW and/or the inner winding IW. The module antenna MA may have the opposite sense (CW, or CCW) as the outer winding OW and inner winding IW.

It may be noted that NL 9100347 and U.S. Pat. No. 5,955,723 both describe 2 coils that are of a "given dimension". For example Coils 1 & 3—Coil 1 on the chip and Coil 3 on the card—and they also say they are concentric to each other and that allows the coupling. In the arrangements described herein, the coils (MA, CC) are not restricted to being the same size, nor are they restricted to being concentrically positioned.

In the course of laying the wire (or otherwise creating conductive paths for the antenna elements OW, CC, IW, using any of a variety of additive or subtractive processes) for the booster antenna BA, it is evident that the wire (or conductive path) may need to cross over itself at several positions. For a booster antenna BA comprising wire, the wire may be insulated, typically self-bonding wire. For conductive paths, appropriate insulating or passivation layers or films may be used to facilitate cross-overs.

Comparing the Booster Antenna BA Embodiments with Siemens '723 and Assa '166

In U.S. Pat. No. 5,955,723 (Siemens), the booster antenna comprises a large coil/conductor loop 3 (compare the outer winding OW and inner winding IW) and a smaller conductor loop 4 (compare the coupler coil CC). Neither of the large loop 3 or the smaller loop 4 exhibit any "sense", since only one turn is illustrated for each, and there are no free ends (compare IE of OW and OE of IW in the BA of FIG. 3).

In U.S. Pat. No. 8,130,166 (Assa Abloy), the booster antenna has free ends (13) and (13') and comprises an outer winding (11) and an inner winding (11') disposed near the periphery of the card body, and a coupler coil (12) disposed at the interior of the card body. Similar in some regards to the present invention, Assa '166 is different with respect to at least the following points . . .

| U.S. Pat. No. 8,130,166 | Booster Antenna BA - FIGS. 3, 3A, 3B, 3C, 3D |
|---|---|
| The outer end (13) of the outer winding (11) is a free end | The inner end IE of the outer winding OW is a free end |
| The inner end (13') of the inner winding (11') is a free end | The outer end OE of the inner winding IW is a free end |
| The outer winding (11) exhibits a CW sense | - same- |
| The coupler coil (12) is laid from outer end to inner end, and exhibits a CW sense (same as inner and outer windings) | 3A: CC laid from OE to IE, with CCW sense |
| | 3B: CC laid from OE to IE, with CW sense |
| | 3C: CC laid from IE to OE, with CW sense |
| | 3D: CC laid from IE to OE, with CCW sense |
| The inner winding (11') exhibits a CW sense | -same- |
| "the small spiral of the central section shows a larger pitch than the pitches of the large spirals of the external sections" | CC has same or smaller pitch than the OW or IW (pitch of CC "not larger than" pitch of OW or IW) |

The FIGS. 3A, 3B, 3C, 3D embodiments differ from U.S. Pat. No. 8,130,166 in that the inner end IE of the outer winding OE and the outer end OE of the inner winding (IW are free ends (FIGS. 3A, 3B, 3C, 3D).

the coupler coil CC is laid from inner end IE to outer end OE (FIGS. 3C, 3D)

the sense of the coupler coil CC is opposite the sense of the outer winding OW and inner winding IW (FIGS. 3A, 3D).

the pitch of the coupler coil CC may be less than or equal to the pitch of the outer winding OW or inner winding IW, and it may have more turns of wire than the outer winding OW or inner winding IW In a variation of the above, referred to as "3E", a booster antenna BA may comprise an outer winding OW and an inner winding IW (two external sections) which are connected with one another in the manner of U.S. Pat. No. 8,130,166 (with the outer end of the outer winding and the inner end of the inner winding free, or "loose"), and the coupler coil (central section) is formed with the opposite sense as the external sections.

In another variation of the above, referred to as "3F", a booster antenna BA may comprise an outer winding OW and an inner winding IW (two external sections) which are connected with one another in either the manner of U.S. Pat. No. 8,130,166 or as a quasi-dipole (such as in FIG. 2), and the coupler coil CC (central section) shows the same or a smaller pitch than the external sections.

The coupler coil CC may have approximately 10 turns, and the outer winding OW and inner winding IW may have only approximately 2-3 (such as at least 1, no greater than 4) turns each. The actual number of turns for the outer an inner windings OW, IW, and the coupler coil CC may be determined by the application. But generally, the coupler coil CC may have more turns than either of the outer winding OW or inner winding IW. This feature is referred to as "3G". This feature is referred to as "3G".

Ferrite material may be disposed at various locations on the card body CB to enhance the various inductive couplings contemplated herein.

Some Further Contrasts Between Assa '166 and Embodiments of the Invention

| U.S. Pat. No. 8,130,166 | Booster Antenna BA - variations and features |
|---|---|
| The outer end (13) of the outer winding (11) is a free end | 3E) - same - |
| The inner end (13') of the inner winding (11') is a free end | 3E) - same - |
| The coupler coil (12) is laid from outer end to inner end, and exhibits a CW sense (same as inner and outer windings) | 3E) CC exhibits CCW sense |
| "the small spiral of the central section shows a larger pitch than the pitches of the large spirals of the external sections" | 3F) CC has same or smaller pitch than external sections ('166 type external sections, or quasi-dipole type outer and inner windings) |
| small spiral has fewer turns, larger pitch than the external sections | 3G) CC has more turns than OW or IW, and equal or smaller pitch |

Conventional antenna modules (AM's) may be used with the booster antennas (BA's) disclosed herein, and modifications thereof. It has been mentioned that the antenna module (AM) may be disposed in the card body (CB), such as in a milled recess (see FIG. 1A), so that its module antenna MA overlaps, or is within, is substantially coplanar with or on an other level from the coupler coil CC. See, for example, U.S. Pat. No. 6,378,774 (2002, Toppan), incorporated in its entirety by reference herein.

Figure 4:
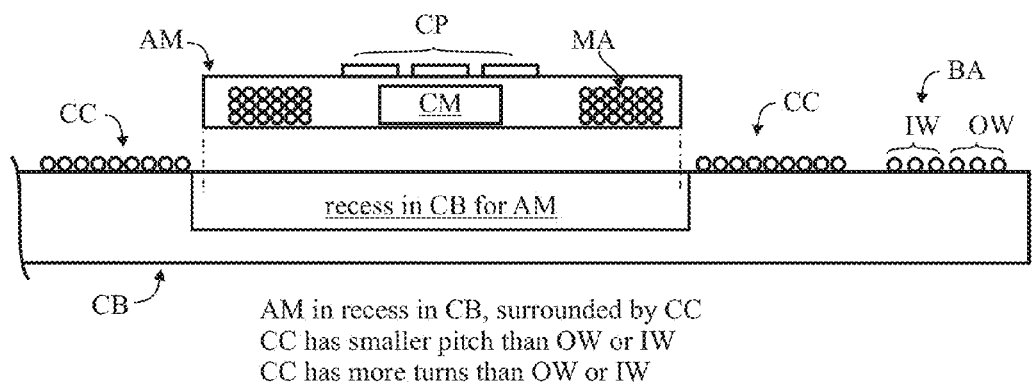
FIG. 4 is a cross-sectional view of a portion of a card body CB) highlighting the coupler coil (CC) and antenna module (AM).

FIG. 4 shows a portion of a card body CB with a recess for receiving the antenna module AM. The coupler coil CC can be seen to surround the recess. When the antenna module AM is installed in the recess, the module antenna MA will be disposed within the interior of the coupler coil CC—in other words, the coupler coil CC may surround the antenna module AM and its module antenna—and the module antenna MA may be substantially coplanar with the coupler coil CC. This is, for example, in contrast with FIG. 3B of U.S. Pat. No. 6,378,774 (2002, Toppan) wherein the coil (8) which is connected to the chip (6) is disposed over the coupler coil (3). In FIG. 4, only a portion of the card body CB and booster antenna BA are illustrated, for illustrative clarity, in a manner comparable to the showings of only portions of the booster antenna BA illustrated in FIGS. 3A-3D.

Some Embodiments without a Coupler Coil (CC)

Figure 5:
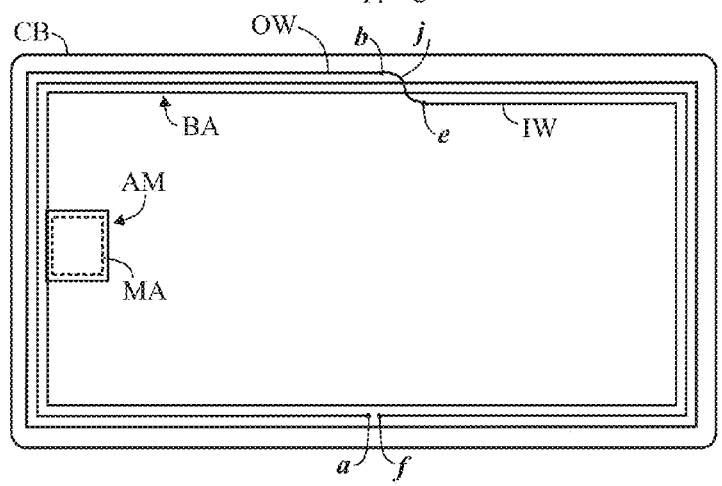
FIGS. 5, 5A-5F are diagrams (plan view) of various configurations of a quasi-dipole booster antenna (BA), with an antenna module (AM) located for inductively coupling therewith.

FIG. 5 is similar to FIG. 2A and shows a booster antenna BA having an outer winding OW and an inner winding IW. The outer winding OW is disposed near the periphery of the card body CB. The inner winding IW is disposed within the outer winding OW (towards the interior of the card body CB). Both of the outer winding OW and inner winding IW are shown with only a representative few number of turns, for illustrative clarity.

The outer winding OW is in a spiral pattern, and exhibits a clockwise sense, from an inner end IE "a" to an outer end OE "b" thereof.

The inner winding IW is in a spiral pattern, and exhibits a clockwise sense, from an inner end IE "e" to an outer end OE "f" thereof.

The outer end OE "b" of the outer winding OW (compare "7", FIG. 2A) is connected such as with a jumper "j" with the inner end IE "e" of the inner winding IW (compare "10", FIG. 2A).

The inner end "a" of the outer winding OW (compare "8", FIG. 2A) and the outer end "f" of the inner winding IW (compare "9", FIG. 2A) are free ends (left un-connected).

The free ends (a, f) of the booster antenna BA-1, BA-2 are shown near the bottom edge of the card body CB, but may be located elsewhere.

The antenna module AM may be disposed so that its module antenna MA overlies (overlaps) only the inner winding IW. No coupler coil (CC) is used in this embodiment (contrast FIG. 3).

Some modifications to and variations of this booster antenna BA without coupler coil (CC) will be shown in and described with respect to FIGS. 5A-5K. Unless otherwise specified, in all of the examples, the booster antenna BA has an outer winding OW and an inner winding, with the outer end "b" of the outer winding OW connected with the inner end "e" of the inner winding IW, the inner end "a" of the outer winding OW and outer end "f" of the inner winding IW being free ends.

The modifications and variations shown in and described with respect to FIGS. 5A-5K are generally directed to improving inductive coupling between the module antenna MA and the booster antenna BA by re-routing at least the inner winding IW of the booster antenna BA to more closely surround (enclose) the antenna module AM (and its module antenna MA). In these examples, a round (circular) antenna module AM is illustrated, which may have a corresponding round (circular) module antenna MA. The windings (OW, IW) of the booster antenna BA may also be rounded in the area of the antenna module AM. In these embodiments, the booster antenna BA may be disposed primarily at the periphery (just inside the top, bottom, left and right side edges) of the card body CB.

Figure 5A:
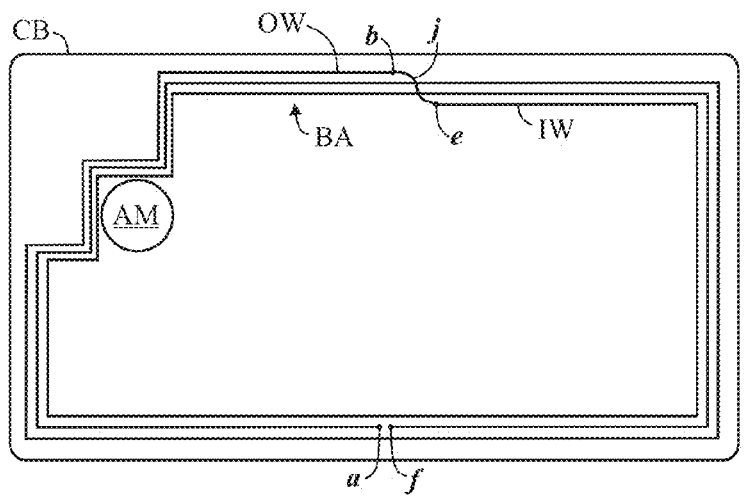

FIG. 5A shows re-routing both the outer winding OW and the inner winding IW, away from the top left corner (as viewed) of the card body CB towards the interior area (away from the periphery) of the card body CB, to achieve an approximately 90° enclosure of the antenna module AM. This embodiment simply brings a relevant portion of the booster antenna BA to the antenna module AM which is disposed more towards the interior of the card body CB. The area in and immediately around the antenna module, in this and other embodiments, may be referred to as a "coupling area". (The position of the antenna module AM and its contact pads CP may be prescribed by ISO-7816.)

Figure 5B:
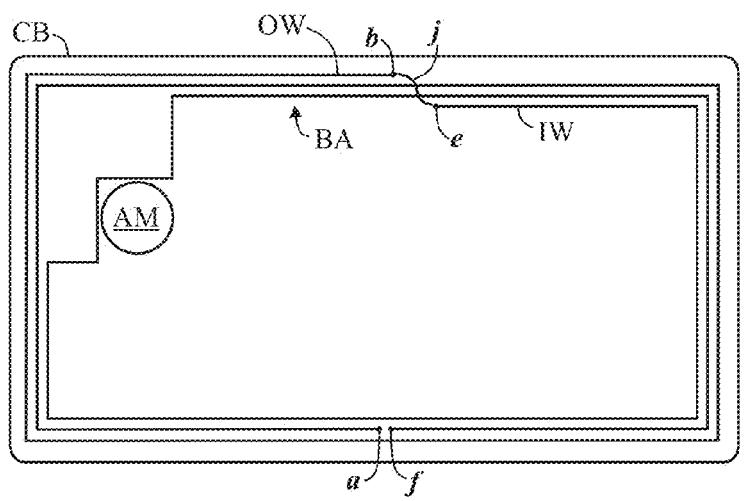

FIG. 5B shows re-routing only the inner winding IW, away from the top left corner (as viewed) of the card body CB towards the interior of the card body CB, to achieve an approximately 90° enclosure of the antenna module AM. This has the benefit of separating the inner winding IW from the outer winding OW to allow the module antenna MA to overlap all of the turns of the inner winding IW without overlapping any of the turns of the outer winding OW.

Figure 5C:
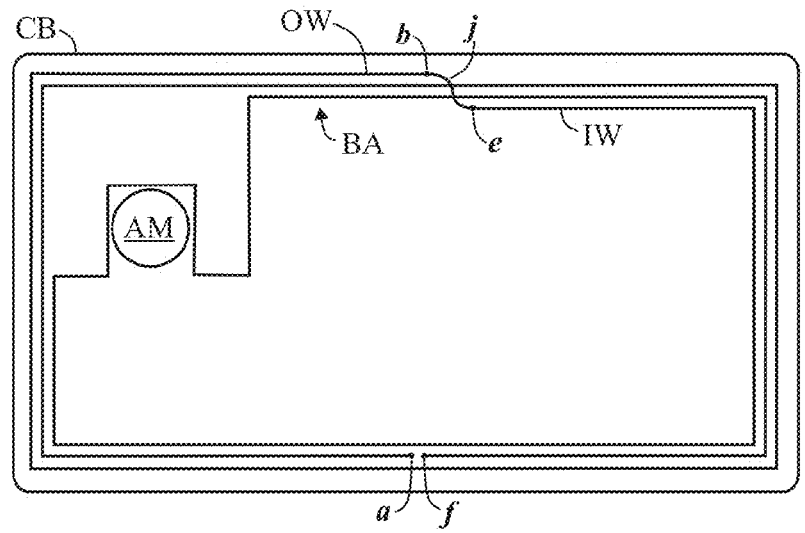

FIG. 5C shows re-routing only the inner winding IW, away from the top left corner (as viewed) of the card body CB towards the interior of the card body CB, to achieve an approximately 180° enclosure of the antenna module AM. Both of the outer winding OW and inner winding IW may be routed to the interior of the card body CB to achieve the approximately 180° enclosure.

Figure 5D:
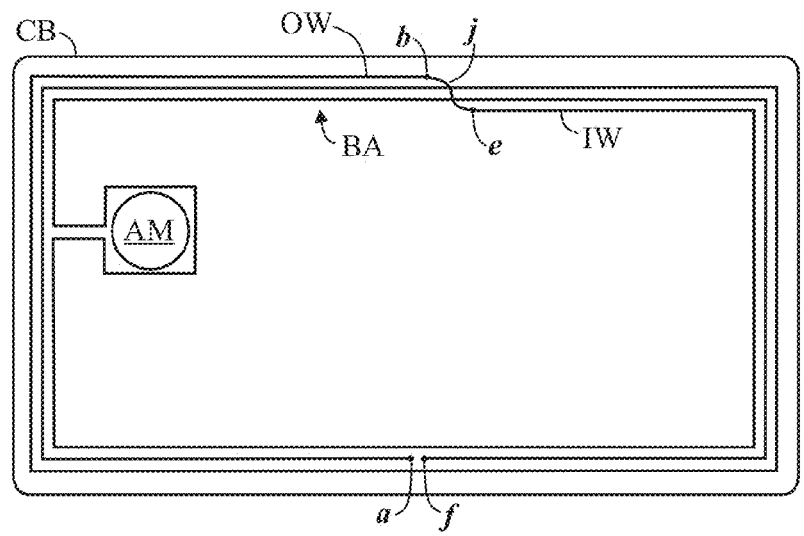

FIG. 5D shows re-routing only the inner winding IW, away from the top left corner (as viewed) of the card body CB towards the interior of the card body CB, to achieve an approximately 360° enclosure of the antenna module AM. Both of the outer winding OW and inner winding IW may be routed to the interior of the card body CB to achieve the approximately 360° enclosure.

Figure 5E:
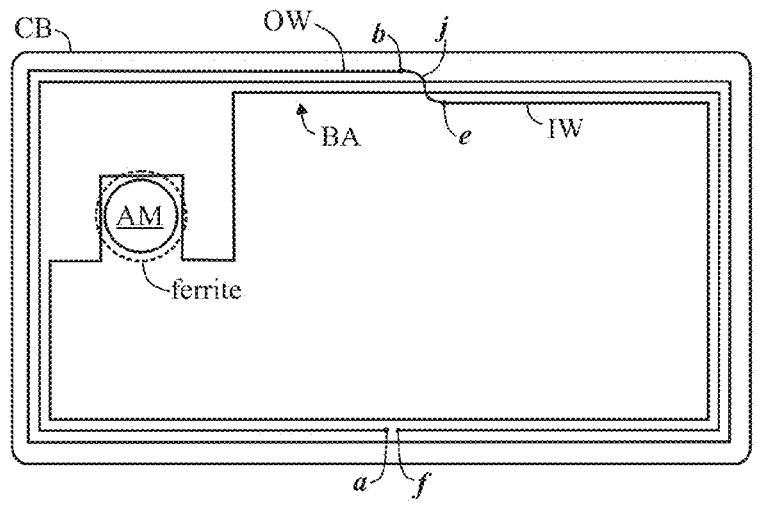

FIG. 5E shows re-routing only the inner winding IW, away from the top left corner (as viewed) of the card body CB towards the interior of the card body CB, to achieve an approximately 180° enclosure of the antenna module AM. In this example, ferrite material (shown in dashed lines) may be incorporated into the card body CB at the location of the antenna module AM to improve coupling between the booster antenna BA and the module antenna MA. This area of the card body CB may be referred to as the "coupling area". The ferrite material may be in the form of a patch, a layer of material, particles incorporated into a layer of the card body CB, etc.

Figure 5F:
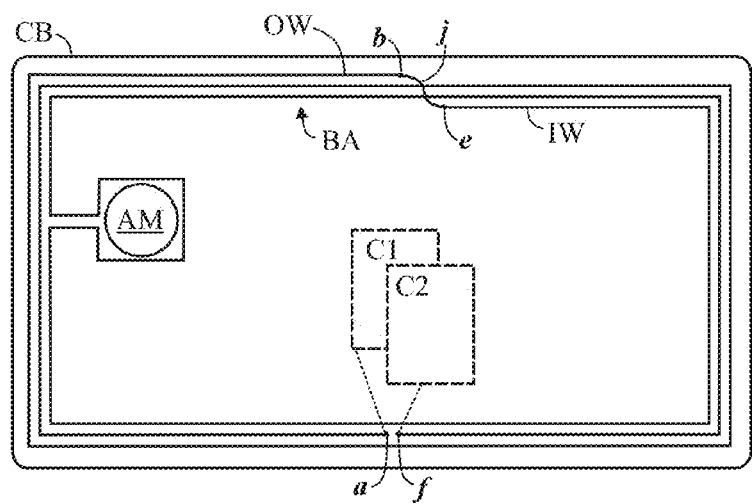

FIG. 5F shows re-routing only the inner winding IW, away from the top left corner (as viewed) of the card body CB towards the interior of the card body CB, to achieve an approximately 360° enclosure of the antenna module AM. In this example, capacitive elements (shown in dashed lines) such as in the form of plates C1, C2 disposed on opposite sides of the card body CB, and overlying one another (shown staggered, for illustrative clarity). The capacitive plates C1, C2 may comprise conductive particles which are deposited or sprayed onto the card body CB, or conductive foils, or the like. One plate C1 may be connected to the free inner end "a" of the outer winding OW, the other plate C2 may be connected to the free outer end "f" of the inner winding IW.

Figure 5G:
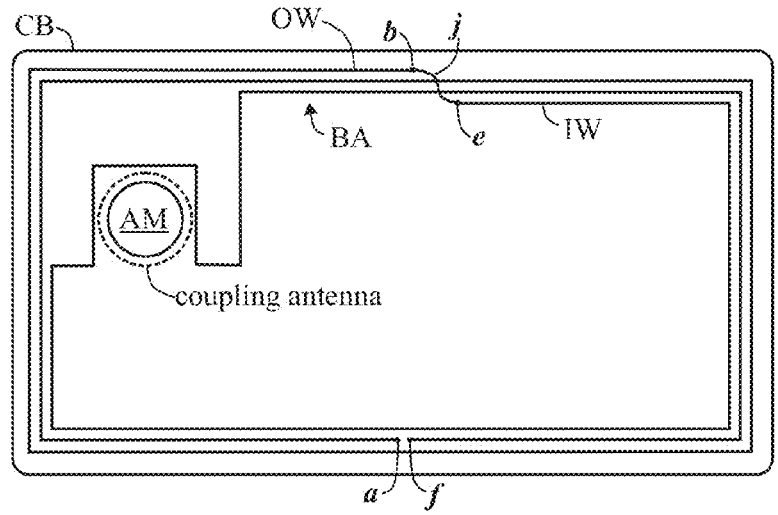
FIG. 5G is a diagram (plan view) of a configuration of a quasi-dipole booster antenna (BA), showing a separated coupling antenna associated therewith.

FIG. 5G shows re-routing only the inner winding IW, away from the top left corner (as viewed) of the card body CB towards the interior of the card body CB, to achieve an approximately 180° enclosure of the antenna module AM. In this example, an additional coupling antenna is incorporated into the card body CB, interposed between the enclosure area of the inner winding IW and the module antenna MA—in other words, in the coupling area—to assist in coupling between the booster antenna BA and the module antenna MA. The coupling antenna is not connected with the booster antenna BA (contrast FIG. 3, wherein the coupler coil CC is connected/contiguous with the windings OW/IW of the booster antenna BA).

Figure 5H:
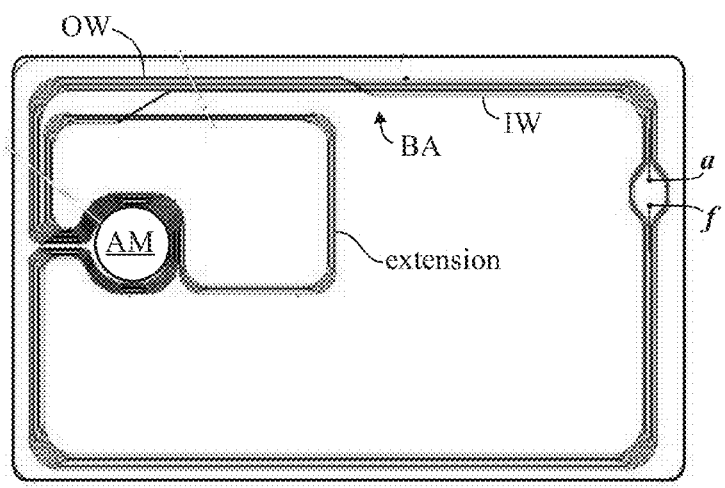
FIG. 5H is a diagram (plan view) of a configuration of a quasi-dipole booster antenna (BA), showing a separated antenna extension associated therewith.

FIG. 5H shows a booster antenna BA similar to the one described with respect to FIG. 5D, wherein a portion of the booster antenna BA nearly fully encircles the antenna module in what may be referred to as a "coupling area". In FIG. 5D, only the inner winding IW encircles the antenna module AM in the coupling area. In FIG. 5H, both of the outer winding OW and inner winding IW encircle the antenna module AM in the coupling area. The free ends (a, f) of the booster antenna BA are shown disposed at the right edge of the card body CB. An "extension" of the inner winding IW is shown, comprising some turns of wire in a spiral pattern disposed near the antenna module AM in the left hand side of the top (as viewed) portion of the card body CB. The extension is disposed outside of, but near the coupling area.

FIGS. 5I,J,K illustrate forming two booster antennas, one on each of two opposite sides of the card body (substrate). FIG. 5I shows that a first booster antenna BA-1 may be formed on one side of the card body CB and encircle the top half (approximately 180°) of the antenna module AM. FIG. 5J shows that a second booster antenna BA-2 may be formed on the opposite side of the card body CB and encircle the bottom half (approximately 180°) of the antenna module AM.

Each of the booster antennas BA-1, BA-2 may comprise a outer winding OW and inner winding IW, and may have two free ends "a" and "f". The free ends (a, f) of the booster antennas BA-1, BA-2 are shown towards the bottom of the right edge of the card body CB.

FIGS. 5I and 5J show an embossing area (in dashed lines) on the bottom portion of the card body CB, which is an area "reserved" for embossing, in which the booster antennas BA-1 and BA-2 should not encroach. They may however pass along (just inside of) the bottom edge of the card body CB.

FIG. 5K shows that in combination with one another, the two booster antennas BA-1 and BA-2 provide full enclosure (approximately 360°) of the antenna module AM. In FIG. 5K, the card body (CB) and antenna module (AM) are omitted, for illustrative clarity. The two booster antennas BA-1 and BA-2 may constitute what may be referred to as a "composite booster antenna".

It should be understood that in various ones of the configurations for booster antennas shown in FIGS. 5A-5K, booster antennas other than FIG. 2A type quasi-dipole booster antenna may be employed to achieve the desired enclosure of the antenna module and consequent improvements to coupling between the module antenna and the booster antenna.

Some Additional Embodiments

In the following embodiments, the antenna module (AM) is disposed on the upper portion of the card body (CB) of a smart card, in a conventional manner, and the booster antenna (BA) is also disposed primarily (substantially, including fully) on the upper portion of the card body (CB). The lower portion (Embossing Area) of the card body CB is "reserved" for embossing, and other than a small area at the perimeter is generally not available for a booster antenna.

Figure 6A:
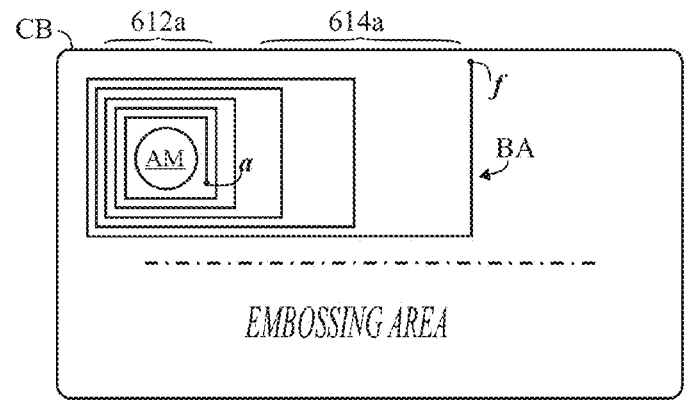
FIGS. 6A,B,C are diagrams (plan view) of additional configurations for booster antennas.

FIG. 6A illustrates a smart card having a card body CB, an antenna module AM disposed in the upper portion of the card body CB. A booster antenna BA is generally in the form of a rectangular spiral of wire (or other conductive material), having two free ends "a" and "f". Only a representative few turns of the booster antenna BA are illustrated.

A portion 612a of the booster antenna BA is closely spiraled around the antenna module AM in the manner of the coupler coils (CC) described hereinabove with respect to FIGS. 3, 3A-3D. This "coupler portion" 612a of the booster antenna BA may have a relatively small pitch. Although the coupler portion 612a is shown as being at one end portion of the overall booster antenna BA, it may be created at an portion, such as a midsection of the booster antenna BA.

A remaining portion 614a of the booster antenna BA has a pitch that may increase across the width of the card body. The general idea is that the booster antenna BA may cover substantially the entire width of the card body. Since the width of the card body is greater than its height, even more so when comparing the width of the card body with the height of the upper portion only, there is more room in the width dimension for the turns of the booster antenna to spread out, and this area may be advantageously utilized.

If the coupler portion 612a were formed at a midsection of the overall booster antenna BA (rather than at one end, as shown), the remaining portion 614a of the booster antenna would have two portions (or "poles") extending from the coupler portion 612a, forming a kind of dipole antenna. This would be analogous to the FIG. 3 type booster antenna, described as a "quasi-dipole" which has an outer winding OW and an inner winding IW extending from a more-or-less central coupler coil CC.

Figure 6B:
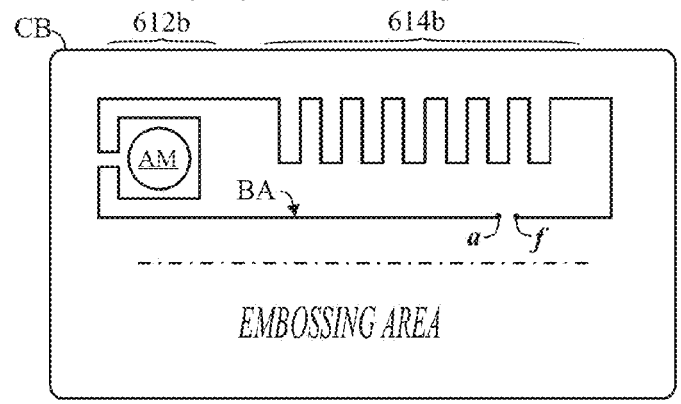

FIG. 6B illustrates a smart card having a card body CB, an antenna module AM disposed in the upper portion of the card body CB. A booster antenna BA is generally in the form of a rectangular loop of wire (or other conductive material), having two free ends "a" and "f". Only a representative few turns of the booster antenna BA are illustrated.

A portion 612b of the booster antenna BA, which may be referred to as a "coupler portion", is closely spiraled around the antenna module AM in the manner of the coupler coils (CC) described hereinabove with respect to FIGS. 3, 3A-3D.

A remaining portion 614b of the booster antenna BA extends across the width of the card body, and includes a portion which is formed with a zig-zag, for improved capacitance. This remaining portion 614 may exhibit a spiral pattern.

In the embodiments of FIGS. 6A and 6B, the booster antenna BA is illustrated disposed entirely within the upper portion of the card body CB, not encroaching on the lower embossing area. However, it is evident that the ends "a" and "f" of the booster antenna(s) could extend into the embossing area.

Figure 6C:
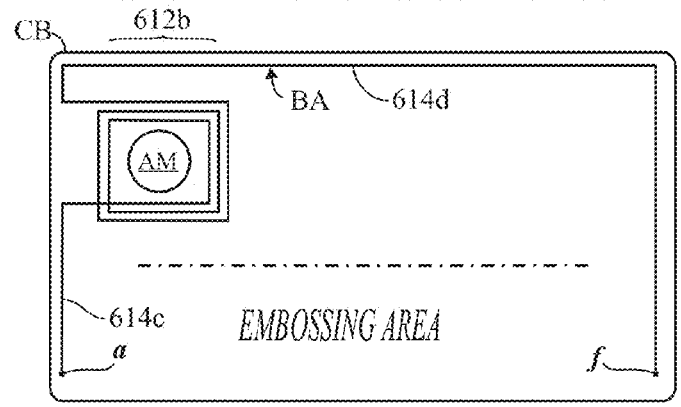

FIG. 6C illustrates a smart card having a card body CB, an antenna module AM disposed in the upper portion of the card body CB. A booster antenna BA is generally in the form of a rectangular loop of wire (or other conductive material), having two free ends "a" and "f". Only a representative few turns of the booster antenna BA are illustrated.

A portion 612c of the booster antenna BA, which may be referred to as a "coupler portion", is closely spiraled around the antenna module AM in the manner of the coupler coils (CC) described hereinabove with respect to FIGS. 3, 3A-3D.

In this example, the coupler portion 612c is shown formed at a midsection of the overall booster antenna BA (rather than at one end, as shown), and there are two remaining portions 614c, 614d of the booster antenna BA extending from the coupler portion 612c, forming a kind of dipole antenna. This is somewhat analogous to the FIG. 3 type booster antenna, described as a "quasi-dipole" which has an outer winding OW and an inner winding IW extending from a more-or-less central coupler coil CC.

The remaining portion 614c extends from one end of the coupler portion 612c along a side edge (left side, as viewed) of the card body CB into the embossing area. (This is acceptable to have a portion of the booster antenna BA in a peripheral region only of the embossing area.)

The remaining portion 614d extends from the other end of the coupler portion 612c along the top edge of the card body CB to the right (as viewed) side edge thereof, thereafter extending down the right edge of the card body CB into the embossing area.

The booster antenna BA with remaining portions 614c and 614d extending from the two ends of the coupler portion 612c) forms a kind of dipole antenna which is somewhat analogous to the FIG. 3 type booster antenna.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. A data carrier component comprising:
   a substrate (CB) having at least one surface and a periphery; and
   a booster antenna (BA) disposed on at least one surface of the substrate (CB) and extending around the periphery of the substrate (CB);
   wherein the booster antenna (BA) comprises an outer winding (OW) having an outer end (b) and an inner end (a) and an inner winding (IW) having an outer end (f) and an inner end (e); and
   a coupler coil (CC) disposed on the card body (CB) and having two ends (c, d), one of which is connected with the outer winding (OW), the other of which is connected with the inner winding (IW);
   characterized in that:
   the one end (c) of the coupler coil (CC) is connected with the outer end (b) of the outer winding (OW);
   the other end (d) of the coupler coil (CC) is connected with the inner end (e) of the inner winding (IW); and
   the inner end (a) of the outer winding (OW) and the outer end (f) of the inner winding (IW) are left unconnected.

2. The data carrier component of claim 1, wherein:
   the outer winding (OW) and the inner winding (IW) are connected in reverse phase with one another, via the coupler coil (CC).

3. The data carrier component of claim 1, wherein:
   a sense for each of the outer winding (OW), inner winding (IW) or coupler coil (CC) is one of a first and a second opposite senses selected from clockwise (CW) or counter-clockwise (CCW);
   at least one of the outer winding (OW) and inner winding (IW) exhibits the first of the two opposite senses; and
   the coupler coil (CC) exhibits the second of the two opposite senses.

4. The data carrier component of claim 1, wherein:
   the one end (c) of the coupler coil (CC) is its outer end (OE).

5. The data carrier component of claim 1, wherein:
   the other end (d) of the coupler coil (CC) is its outer end (OE).

6. The data carrier component of claim 1, wherein:
   the outer winding (OW) has a number of turns;
   the inner winding (IW) has a number of turns; and
   the coupler coil (CC) has a greater number of turns than at least one of the outer winding (OW) and the inner winding (IW).

7. The data carrier component of claim 1, wherein:
   the outer winding (OW) has a first pitch;
   the inner winding (IW) has a second pitch; and
   the coupler coil (CC) has a third pitch which is not greater than at least one of the first and second pitches.

8. The data carrier component of claim 1, further comprising:
   an antenna module (AM) comprising at least one chip or chip module (CM) and a module antenna (MA) disposed on the card body (CB) so that the module antenna (MA) inductively couples with the coupler coil (CC).

9. The data carrier component of claim 8, wherein:
   the module antenna (MA) is disposed within the coupler coil (CC).

10. The data carrier component of claim 8, wherein:
    the antenna module (AM) is disposed in a recess in the card body (CB) so that the module antenna (MA) is substantially coplanar with the coupler coil (CC).

11. A method of improving RF coupling between an external reader and a data carrier, the data carrier comprising:
    providing a substrate (CB);
    providing a booster antenna (BA) on the substrate (CB) comprising an outer winding (OW) and an inner winding (IW) disposed around the periphery of the substrate (CB), and a coupler coil (CC) connected to ends of the outer winding (OW) and inner winding (IW); and providing an antenna module (AM) having an RFID chip (CM) and a module antenna (MA) on the substrate (CB); characterized in that:
the booster antenna (BA) is configured as a quasi-dipole antenna with the outer winding (OW) and inner winding (IW) connected in reverse phase with one another.

12. The method of claim 11, wherein:
the outer winding (OW) has an outer end (b) and an inner end (a);
the inner winding (IW) has an outer end (f) and an inner end (e);
the inner end (e) of the inner winding (IW) is connected, via the coupler coil (CC), with the outer end (b) of the outer winding (OW); and
the inner end (a) of the outer winding (OW) and the outer end (f) of the inner winding (IW) are unconnected.

13. The method of claim 11, wherein:
the outer winding (OW), inner winding (IW) and coupler coil (CC) are formed as spirals, each exhibiting one of two opposite senses which are defined as clockwise (CW) and counter-clockwise (CCW);
the outer winding (OW) exhibits a first of the two senses;
the inner winding (IW) exhibits the first of the two senses; and
the coupler coil (CC) exhibits a second of the two senses which is opposite the first sense.

14. The method of claim 11, wherein:
the outer winding (OW) has a pitch;
the inner winding (IW) has a pitch which is substantially the same as the pitch of the outer winding; and
the coupler coil (CC) has a pitch which is not larger than the pitch of the outer winding (IW) and the inner winding (IW).

15. The method of claim 11, wherein:
the outer winding (OW) has a number of turns;
the inner winding (IW) has a number of turns which is substantially the same as the number of turns for the outer winding (OW); and
the coupler coil (CC) has a number of turns which is greater than the number of turns for the outer winding (IW) and the inner winding (IW).

16. Smart card comprising a card body (CB), a booster antenna (BA) in the card body (CB) and an antenna module (AM) disposed on the card body, characterized in that:
the booster antenna is disposed primarily at the periphery of the card body, and a portion of the booster antenna is routed towards an interior area of the card body, to achieve at least an approximately 90° enclosure of the antenna module in a coupling area of the card body.

17. The smart card of claim 16, wherein:
the booster antenna comprises an outer winding (OW) and an inner winding (IW), and only the inner winding is routed towards the interior of the card body, the outer winding remaining substantially at the periphery of the card body.

18. The smart card of claim 16, further comprising at least one of:
ferrite disposed in the card body in the coupling area in and around the antenna module;
capacitive elements connected with free ends of the booster antenna.

19. The smart card of claim 16, wherein the booster antenna comprises an outer winding (OW) and an inner winding (IW), and further comprising:
an extension of the inner winding disposed near the coupling area.

20. The smart card of claim 16, wherein the booster antenna comprises:
a first booster antenna (BA-1) disposed on one side of the card body; and
a second booster antenna (BA-2) disposed on an opposite side of the card body.

21. A data carrier component comprising:
a substrate (CB) having at least one surface and a periphery; and
a booster antenna (BA) disposed on at least one surface of the substrate (CB) and extending around the periphery of the substrate (CB);
wherein the booster antenna (BA) comprises an outer winding (OW) having an outer end (b) and an inner end (a) and an inner winding (IW) having an outer end (f) and an inner end (e); and
a coupler coil (CC) disposed on the card body (CB) and having two ends (c, d), one of which is connected with the outer winding (OW), the other of which is connected with the inner winding (IW);
characterized in that:
the one end (c) of the coupler coil (CC) is connected with the outer end (b) of the outer winding (OW);
the other end (d) of the coupler coil (CC) is connected with the inner end (e) of the inner winding (IW); and
the inner end (a) of the outer winding (OW) and the outer end (f) of the inner winding (IW) are left unconnected;
wherein the data carrier further comprises at least one of the following features:
(i) a sense for each of the outer winding (OW), inner winding (IW) or coupler coil (CC) is one of a first and a second opposite senses selected from clockwise (CW) or counter-clockwise (CCW); at least one of the outer winding (OW) and inner winding (IW) exhibits the first of the two opposite senses; and the coupler coil (CC) exhibits the second of the two opposite senses;
(ii) the outer winding (OW) has a number of turns; the inner winding (IW) has a number of turns; and the coupler coil (CC) has a greater number of turns than at least one of the outer winding (OW) and the inner winding (IW);
(iii) the outer winding (OW) has a first pitch; the inner winding (IW) has a second pitch; and the coupler coil (CC) has a third pitch which is not greater than at least one of the first and second pitches.

* * * * *